(12) United States Patent
Shiu et al.

(10) Patent No.: US 6,798,826 B1
(45) Date of Patent: Sep. 28, 2004

(54) METHOD AND APPARATUS FOR PERFORMING REVERSE RATE MATCHING IN A CDMA SYSTEM

(75) Inventors: Da-Shan Shiu, San Jose, CA (US); Avneesh Agrawal, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 524 days.

(21) Appl. No.: 09/707,349

(22) Filed: Nov. 6, 2000

(51) Int. Cl.[7] .......................... H04B 1/707; H04B 7/216
(52) U.S. Cl. ....................... 375/147; 375/141; 375/316; 375/340; 370/342
(58) Field of Search .................. 375/141, 147, 375/259, 316, 340, 372; 370/320, 335, 342, 441; 341/61; 710/52; 714/746, 786, 790

(56) References Cited

U.S. PATENT DOCUMENTS

| | | | | |
|---|---|---|---|---|
| 6,097,716 A | * | 8/2000 | Abrishamkar | 370/342 |
| 6,160,840 A | * | 12/2000 | Park | 375/141 |
| 6,397,367 B1 | * | 5/2002 | Park et al. | 714/786 |
| 6,473,442 B1 | * | 10/2002 | Lundsjo et al. | 370/320 |
| 6,501,748 B1 | * | 12/2002 | Belaiche | 370/342 |
| 6,510,137 B1 | * | 1/2003 | Belaiche | 370/232 |

FOREIGN PATENT DOCUMENTS

| | | | | |
|---|---|---|---|---|
| EP | 1045521 | 10/2000 | ......... | H03M/13/00 |
| EP | 1091517 | 4/2001 | ............ | H04L/1/00 |
| EP | 1130838 | 9/2001 | ............ | H04L/1/00 |
| FR | 2792787 | 4/1999 | ............ | H04J/13/00 |
| WO | 0057562 | 9/2000 | ......... | H03M/13/27 |
| WO | 0105059 | 1/2001 | ............ | H04B/7/02 |

OTHER PUBLICATIONS

ETSI TS 125 212 v3.1.1, "Universal Mobile Telecommunications System (UMTS); Multiplexing and Channel Coding (FDD)", 2000—01, pps. 1–52.

* cited by examiner

*Primary Examiner*—Betsy L. Deppe
(74) *Attorney, Agent, or Firm*—Philip Wadsworth; Charles Brown; Donald Kordich

(57) ABSTRACT

Techniques for processing symbols received for a (transport) channel in a (W-CDMA) communication system. According to the W-CDMA standard, the coded bits of a transport channel are first rate-matched, then first de-interleaved, and then segmented to form X radio frames, where X is the transmission time interval (TTI) of the transport channel. The radio frames can be processed in various manners. In one aspect, the rate-matching and first interleaving can be applied to the coded bits of the transport channel X times to generate a radio frame with each application. In accordance with a method, the correspondence between the coded bit $x_m$ and the rate-matched bits $y_n$, and between the rate-matched bits $y_n$ and the interleaved bits $z_k$, can be computed based on direct or iterative computations. In another aspects, the first de-interleaving and inverse rate-matching can be applied onto each rad it is received, without having to wait for the remaining radio frames in the TTI to be received. The correspondences between the received symbols $z_k'$, de-interleaved symbols $y_n'$ and de-rate-matched symbols $x_m'$ can be computed. Reduced buffering requirement and reduced processing delays may be achieved based on the above.

32 Claims, 14 Drawing Sheets

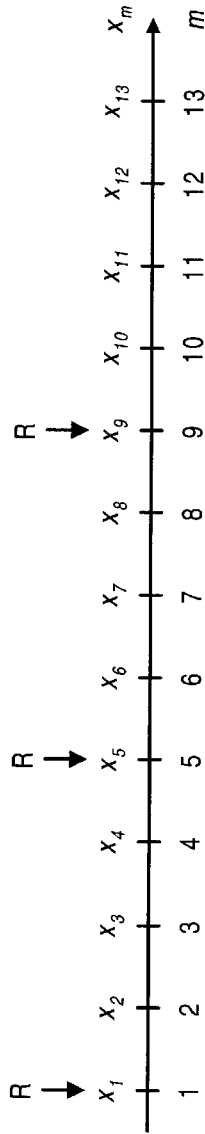
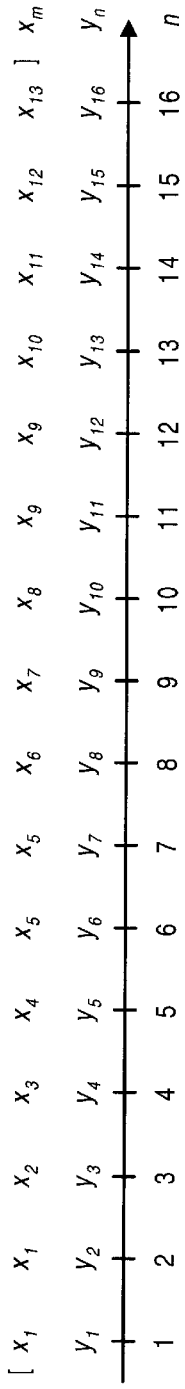
FIG. 4A
FIG. 4B
FIG. 4C

METHOD AND APPARATUS FOR PERFORMING REVERSE RATE MATCHING IN A CDMA SYSTEM

BACKGROUND OF THE INVENTION

I. Field of the Invention

The present invention relates to data communication. More particularly, the present invention relates to a novel and improved method and apparatus for performing rate-matching and reverse rate-matching in a CDMA system.

II. Description of the Related Art

A modern day communication system is required to support a variety of applications. One such communication system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard and incorporated herein by reference. The IS-95 CDMA systems are able to transmit voice data and (albeit not efficiently) packet data. A newer generation standard that can more efficiently transmit packet data is offered by a consortium named "$3^{rd}$ Generation Partnership Project" (3GPP) and embodied in a set of documents including Document Nos. 3G TS 25.211, 3G TS 25.212, 3G TS 25.213, 3G TS 25.214, and 3G TR 25.926, which are readily available to the public. The 3GPP standard is hereinafter referred to as the W-CDMA standard and incorporated herein by reference.

The W-CDMA standard defines a channel structure capable of supporting a number of users and designed for efficient transmission of packet data. In accordance with the W-CDMA standard, data to be transmitted is processed as one or more "transport" channels at a higher signaling layer. The transport channels support concurrent transmission of different types of services (e.g., voice, video, data, and so on). The transport channels are then mapped to one or more "physical" channels that are assigned to a user terminal for a communication (e.g., a call).

The W-CDMA standard allows for a great deal of flexibility in the processing of the transport channels. For example, data for a particular transport channel can be coded using a convolutional code, a Turbo code, or not coded at all. Also, the data can be interleaved over one of four different transmission time intervals (TTI) to provide temporal diversity against deleterious path effects (e.g., fading, multipaths, and so on). Different combinations of coding scheme and interleaving interval can be selected to provide improved performance for different types of services.

The W-CDMA standard also allows the bit rate of the transport channels to change from one TTI to the next. At the transmitter unit, rate-matching is performed such that the total number of bits after the rate-matching is equal to the number of channels bits available for transmission. Bits are repeated or punctured (i.e., deleted) to achieve the desired output bit count.

At the receiver unit, complementary signal processing is performed on the received signal. In particular, de-interleaving is performed for each TTI of received symbols, and inverse rate-matching (also referred to herein as "de-rate-matching") is performed on the de-interleaved symbols. For improved performance, techniques that can be used to efficiently achieve the de-interleaving and de-rate-matching are highly desirable.

SUMMARY OF THE INVENTION

The invention provides various techniques to improve the de-interleaving and de-rate-matching at a receiver unit. In accordance with an aspect of the invention, the de-rate-matching is performed on the received symbols $z_k'$ approximately in real time as these symbols are received from a preceding processing element or as they are provided to a subsequent processing element (e.g., using a direct computation to determine the index m of the de-rate-matched symbols $x_m'$). In accordance with another aspect of the invention, the de-interleaving and de-rate-matching are performed concurrently as the symbols $z_k'$ are provided to a buffer such that de-interleaved and de-rate-matched symbols are stored in the buffer. These processing techniques may allow for the use of a smaller buffer to store the de-rate-matched symbols $x_m'$ and may further reduce the processing delays.

An aspect of the invention provides a method for processing symbols received for a (transport) channel in a communication system (e.g., a W-CDMA system). In accordance with the method, a symbol $z_k'$ associated with a first index k is received and a second index n is determined based on the first index k (to achieve de-interleaving of the symbol $z_k'$). A third index m is then determined based on the second index n (to reverse a rate-matching previously performed on the symbol $z_k'$). The received symbol $z_k'$ is then provided to a buffer at a location related to the third index m. The third index m can be determined from the second index n based on a direct computation or an iterative algorithm, both of which are described below. Different direct computations can be used depending on whether bit repetition or puncturing was performed at the transmission source.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 4A through 4E are diagrams that respectively illustrate (1) the bits $x_m$ provided to a rate-matching element, (2) the bits $y_n$ provided from the rate-matching element, (3) the bits during the first interleaving, (4) the bits $z_k$ provided after the first interleaving, and (5) the symbols $x_m'$ stored in the buffer at the receiver unit to achieve the first de-interleaving and de-rate-matching, for a specific example when bit repetition is performed;

FIGS. 7A through 7E are diagrams that respectively illustrate (1) the bits $x_m$ provided to the rate-matching element, (2) the bits $y_n$ provided from the rate-matching element, (3) the bits during the first interleaving, and (4) the bits $z_k$ provided after the first interleaving, for a specific example when puncturing is performed;

DETAILED DESCRIPTION OF THE SPECIFIC EMBODIMENTS

Figure 1:
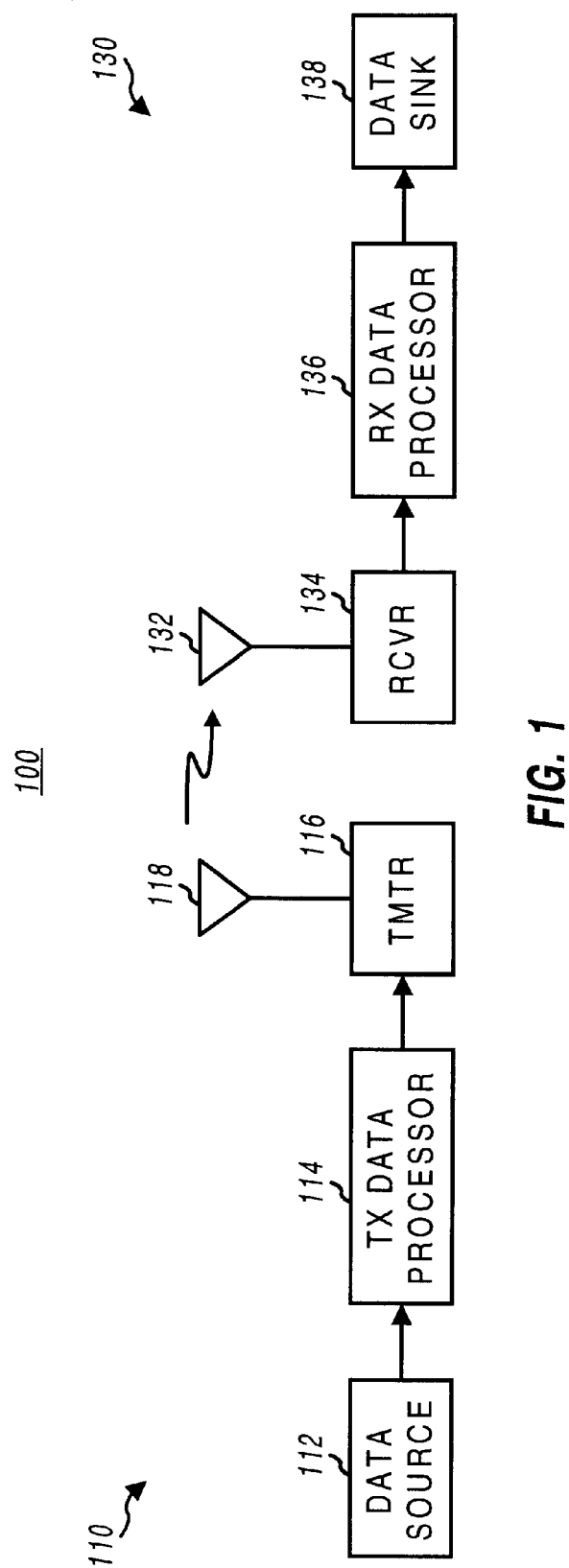
FIG. 1 is a simplified block diagram of a communication system that can implement the invention.

FIG. 1 is a simplified block diagram of a communication system 100 that can implement the invention. In a specific embodiment, communication system 100 is a CDMA system that conforms to the W-CDMA standard. At a transmitter unit 110, data is sent, typically in blocks, from a data source 112 to a transmit (TX) data processor 114 that formats, codes, and processes the data to generate one or more analog signals. The analog signals are then provided to a transmitter (TMTR) 116 that (quadrature) modulates, filters, amplifies, and upconverts the signal(s) to generate a modulated signal. The modulated signal is then transmitted via one or more antennas 118 (only one is shown in FIG. 1) to one or more receiver units.

At a receiver unit 130, the transmitted signal is received by one or more antennas 132 (again, only one is shown) and provided to a receiver (RCVR) 134. Within receiver 134, the received signal(s) are amplified, filtered, downconverted, (quadrature) demodulated, and digitized to generate samples. The samples are then processed and decoded by a receive (RX) data processor 136 to recover the transmitted data. The processing and decoding at receiver unit 130 are performed in a manner complementary to the processing and coding performed at transmitter unit 110. The recovered data is then provided to a data sink 138.

The signal processing described above supports transmissions of voice, video, packet data, messaging, and other types of communication in one direction. A bidirectional communication system supports two-way data transmission. However, the signal processing for the other direction is not shown in FIG. 1 for simplicity.

Figure 2A:
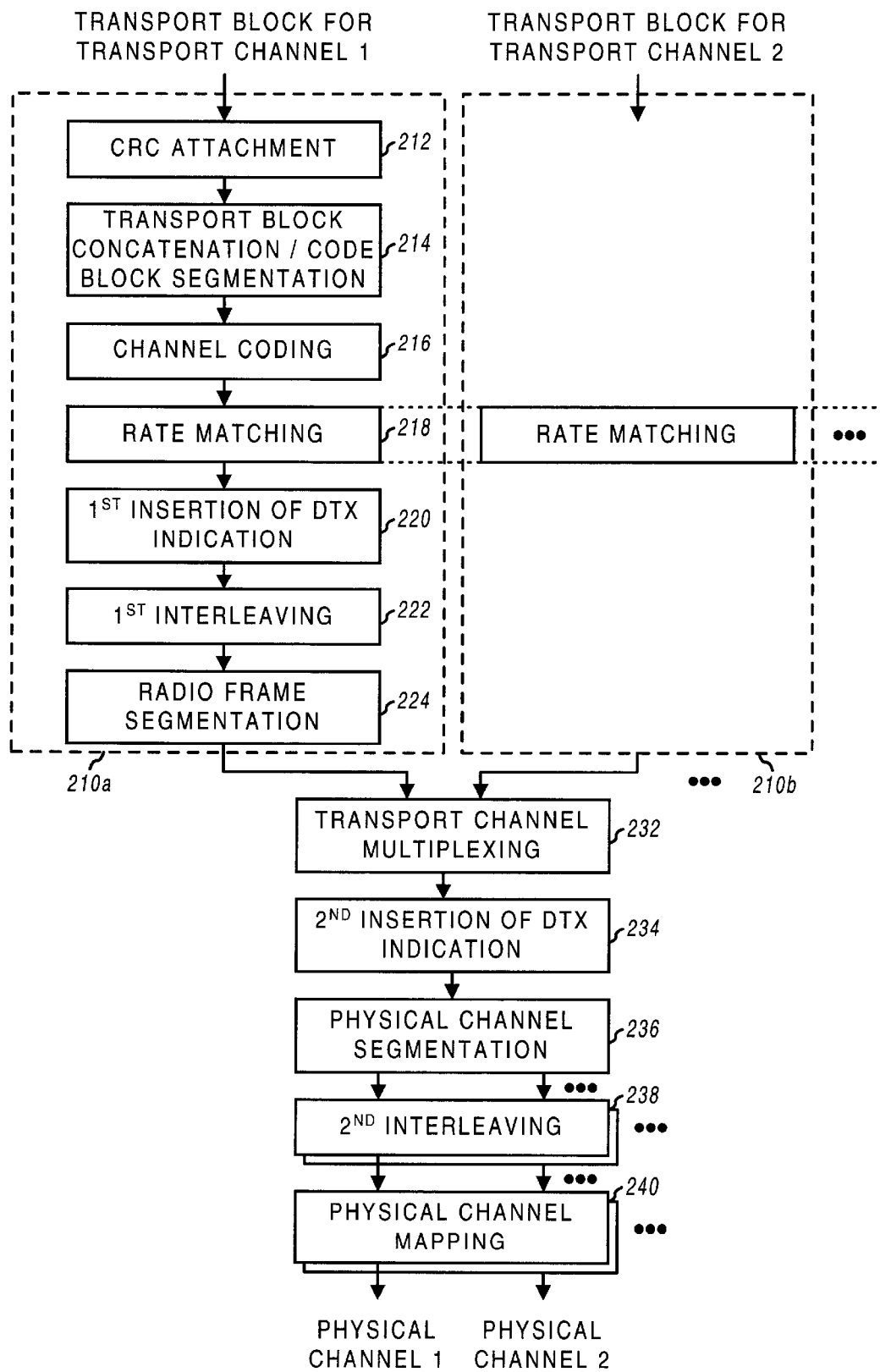
FIGS. 2A and 2B are diagrams of the signal processing at a transmitter unit and a receiver unit, respectively, for a downlink data transmission in accordance with the W-CDMA standard.

FIG. 2A is a diagram of the signal processing at transmitter unit 110 for a downlink data transmission in accordance with the W-CDMA standard. The downlink refers to transmission from a base station to a user terminal (or user equipment (UE)), and the uplink refers to transmission from the user terminal to the base station. The signal processing shown in FIG. 2A is generally performed by transmit data processor 114 in FIG. 1. The upper signaling layers of the W-CDMA system support concurrent transmission of a number of transport channels, with each transport channel capable of carrying data for a particular communication (e.g., voice, video, data, and so on). The data for each transport channel is provided, in blocks that are also referred to as transport blocks, to a respective transport channel processing section 210.

Within transport channel processing section 210, each transport block is used to calculate cyclic redundancy check (CRC) bits, in block 212. The CRC bits are attached to the transport block and used at the receiver unit for error detection. A number of CRC coded blocks are then serially concatenated together, in block 214. If the total number of bits after concatenation is greater than the maximum size of a code block, the bits are segmented into a number of (equal-sized) code blocks. Each code block is then coded with a particular coding scheme (e.g., a convolutional code, a Turbo code) or not coded at all, in block 216.

Rate matching is then performed on the code bits, in block 218. Rate matching is performed in accordance with a rate-matching attribute assigned by higher signaling layers. On the uplink, bits are repeated or punctured (i.e., deleted) such that the number of bits to be transmitted matches the number of bits available. On the downlink, unused bit positions are filled with discontinuous transmission (DTX) bits, in block 220. The DTX bits indicate when a transmission should be turned off and are not actually transmitted.

The bits are then interleaved in accordance with a particular interleaving scheme to provide time diversity, in block 222. In accordance with the W-CDMA standard, the time interval over which interleaving is performed can be selected from a set of possible time intervals (i.e., 10 msec, 20 msec, 40 msec, or 80 msec). The interleaving time interval is also referred to as a transmission time interval (TTI). The TTI is an attribute associated with each transport channel and, in accordance with the W-CDMA standard, does not change for the duration of a communication session. As used herein, a "traffic" comprises the bits within one TTI for a particular transport channel.

When the selected TTI is longer than 10 msec, the traffic is segmented and mapped onto consecutive transport channel radio frames, in block 224. Each transport channel radio frame corresponds to a transmission over a (10 msec) radio frame period. In accordance with the W-CDMA standard, a traffic may be interleaved over 1, 2, 4, or 8 radio frame periods.

The radio frames from all active transport channel processing sections 210 are then serially multiplexed into a coded composite transport channel (CCTrCH), in block 232. DTX bits may then be inserted to the multiplexed radio frames such that the number of bits to be transmitted matches the number of bits available on the physical channel (s) used for the data transmission, in block 234. If more than one physical channel is used, the bits are segmented among the physical channels, in block 236. A particular physical channel can carry transport channels having different TTIs. The bits in each radio frame period for each physical channel are then interleaved to provide additional time diversity, at block 238. The interleaved physical channel radio frames are then mapped to their respective physical channels, at block 240. The subsequent signal processing to generate a modulated signal suitable for transmission to a user terminal is known in the art and not described herein.

Figure 2B:
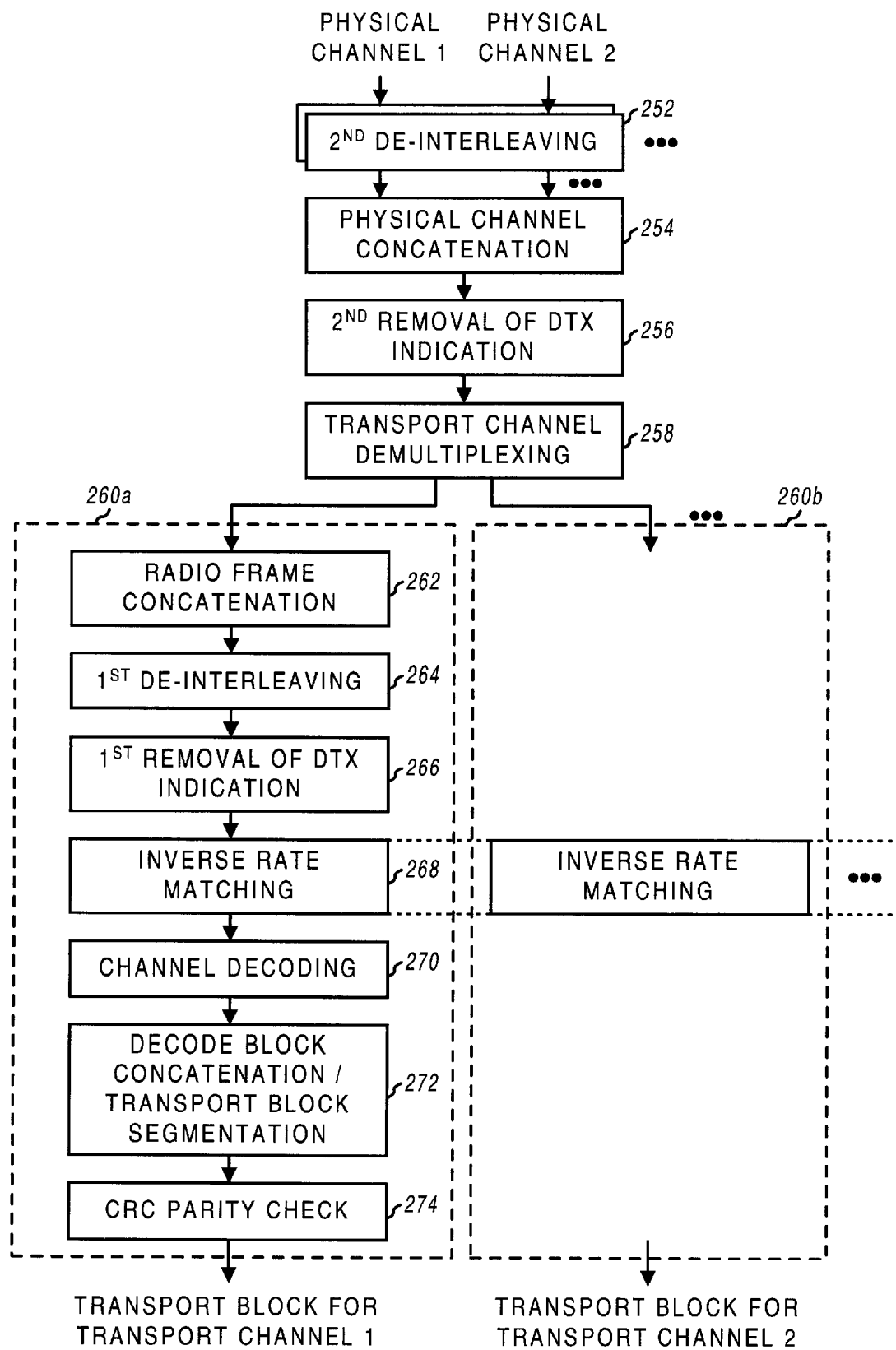

FIG. 2B is a diagram of the signal processing at receiver unit 130 for a downlink data transmission in accordance with the W-CDMA standard. The signal processing shown in FIG. 2B is complementary to that shown in FIG. 2A, and is generally performed by receive data processor 136 in FIG. 1. Initially, the modulated signal is received, conditioned, digitized, and processed to provide symbols for to each physical channel used for the data transmission. Each symbol has a particular resolution (e.g., 4-bit) and corresponds to a transmitted bit. The symbols in each radio frame period for each physical channel are de-interleaved, in block 252, and the de-interleaved symbols from all physical channels are concatenated, in block 254. For a downlink transmission, non-transmitted bits are detected and removed, in block 256. The symbols are then demultiplexed into various transport channels, in block 258. The radio frames for each transport channel are then provided to a respective transport channel processing section 260.

Within transport channel processing section 260, the transport channel radio frames are concatenated into traffics, in block 262. Each traffic includes one or more transport channel radio frames and corresponds to a particular TTI used at the transmitter unit. The symbols within each traffic are de-interleaved, in block 264, and non-transmitted symbols are removed, in block 266. Inverse rate matching is then performed to accumulate repeated symbols and insert "don't cares" for punctured symbols, in block 268. Each coded block in the traffic is then decoded, in block 270. The decoded blocks are then concatenated and segmented into their respective transport blocks, in block 272. Each transport block is then checked for error using the CRC bits, in block 274.

In accordance with the W-CDMA standard, a number of transport channels can be used to send data to a particular user terminal. Each transport channel can be associated with a particular TTI (i.e., 10, 20, 40, or 80 msec) over which its data is interleaved. The TTI for a particular transport channel is determined at the start of a communication session and typically does not change during the session. Different TTIs can be associated with different transport channels and used for different types of services. A shorter TTI provides less time diversity and can be used for services that cannot tolerate long processing delays (e.g., voice). In contrast, a longer TTI may provide improved time diversity and can be used for services that are less sensitive to delays (e.g., traffic data).

The number of bits for a particular transport channel can vary from one TTI to the next. Rate matching is thus performed such that the total number of bits for all transport channels associated with a particular coded composite transport channel (CCTRCH) matches the total number of channel bits available for all physical channels assigned for the CCTRCH. If the total number of bits for the CCTrCH is less than (or greater than) the available number of channel bits, some of the bits are repeated (or punctured, i.e., deleted), respectively. The repetition and puncturing are performed in accordance with the bit count of the CCTrCH and a (semi-static) rate-matching attribute assigned to each transport channel by higher layers.

Figure 3A:
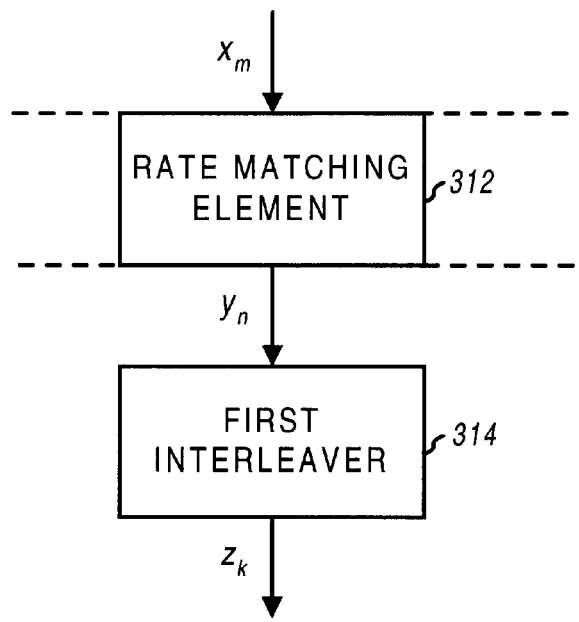
FIGS. 3A and 3B are simplified block diagrams of the rate matching and first interleaving performed at the transmitter unit and the de-interleaving and de-rate matching performed at the receiver unit, respectively.

FIG. 3A is a simplified block diagram of the rate matching and first interleaving performed at the transmitter unit. For each TTI of each transport channel, the coded bits $x_m$ from a channel coding element is provided to a rate-matching element 312, which also receive the rate-matching attribute RM assigned to that transport channel. Rate-matching element 312 then determines the number of bits to be repeated or punctured to achieve the desired bit rate, and further performs the bit repetition or puncturing in accordance with a particular rate-matching pattern. The rate-matched bits $y_n$ are then provided to a first interleaver 314. The interleaving can be achieved by either writing the bits to, or reading the bits from, first interleaver 314 according to a particular permutated order. The interleaved bits $z_k$ are then provided from first interleaver 314 to the subsequent processing element.

In FIG. 3A, $x_m$ represents the bits provided to rate-matching element 312, $y_n$ represents the rate-matched bits provided from rate-matching element 312, and $z_k$ represents the interleaved bits provided from first interleaver 314. The indices m, n, and k are thus used to denote the positions of the unmatched bits x, the rate-matched bits y, and the interleaved bits z, respectively. On the downlink of the W-CDMA system, rate-matching is performed prior to the interleaving, as shown in FIG. 3A. However, on the uplink, rate-matching is performed after the interleaving.

The W-CDMA standard defines various rate-matching schemes for use with various operating modes. The rate matching on the uplink is defined to be (slightly) different from that for the downlink. Also, for the downlink, the rate matching parameters for "fixed" positions of transport channels are computed differently from the parameters for "flexible" positions of transport channels. Moreover, for each type of position, the rate-matching parameters for uncoded and convolutionally encoded transport channels are computed differently than for Turbo encoded transport channels.

In accordance with the W-CDMA standard, based on the knowledge of the transport format combination set for a particular CCTrCH, the number of coded bits to be repeated or punctured for each transport format is determined in such a way that at least one transport format combination results in no DTX and that the puncturing/repetition ratio for a transport channel is approximately constant over all of its transport formats. A set of rate-matching parameters $\{X_i, e_{ini}, e_{plus}, \text{ and } e_{minus}\}$ are computed for each transport format based on the number of bits to be punctured or repeated for a TTI for the transport format. These rate-matching parameters are then used to determine a rate-matching pattern, and the bits are repeated or punctured in accordance with the rate-matching pattern. The computations for the rate-matching parameters are described in further detail in the W-CDMA standard (Document No. 3G TS 25.212).

Once the rate-matching parameters are computed, the rate-matching pattern can be determined in accordance with a defined algorithm. A bit repetition algorithm, which is used when the number of coded bits from a particular transport channel is less than the number of allocated rate-matched bits for the transport channel, is provided by the W-CDMA standard as:

bit repetition algorithm

| | |
|---|---|
| $e = e_{ini}$ -- | set initial value for error e |
| m = 1 -- | set initial value for index m |
| do while (m ≤ $X_i$) -- | perform loop $X_i$ times for $X_i$ input bits |
|    $e = e - e_{minus}$ -- | update error e |
|    do while (e ≤ 0) -- | check if bit m should be repeated |
|       repeat bit $x_m$ -- | repeat bit m |
|       $e = e + e_{plus}$ -- | update error e after a repetition |

-continued bit repetition algorithm

```
        end do
            m = m + 1 --      update index m for next bit
        end do
```

In the above bit repetition algorithm, the first input bit $x_0$ is always repeated (because $e_{ini}=1$). Also, the repeated bit is placed directly after the original bit.

A puncturing algorithm, which is used when the number of coded bits from a particular transport channel is greater than the number of allocated rate-matched bits for the transport channel, is similar to the bit repetition algorithm and is provided by the W-CDMA standard as:

puncturing algorithm

```
    e = e_ini --                set initial value for error e
    m = 1 --                    set initial value for index m
    do while (m ≤ X_i) --       perform loop X_i times for X_i input
                                bits
        e = e − e_minus --      update error e
        if (e ≤ 0) then --      check if bit m should be punctured
            set bit x_m to δ -- puncture bit m by setting it to δ
            e = e + e_plus --   update error e after a puncture
        end if
        m = m + 1 --            update index m for next bit
    end do
```

Figure 3B:
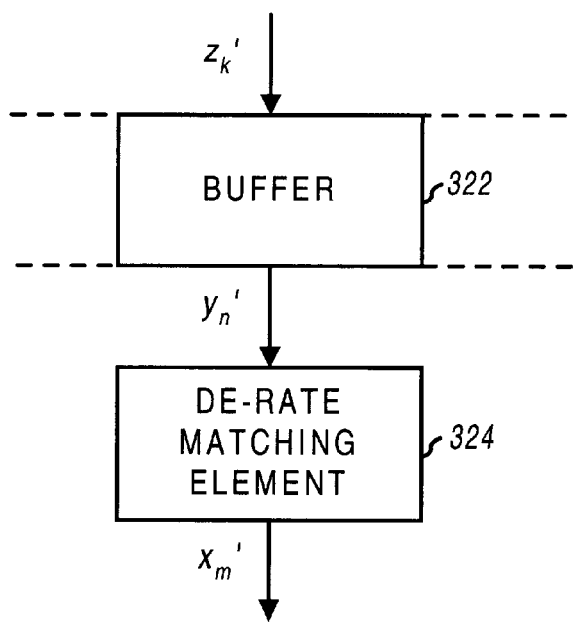

FIG. 3B is a simplified block diagram of the de-interleaving and de-rate matching, which are the complementary signal processing performed at the receiver unit to recover the symbols. For each TTI of each transport channel, the symbols $z_k'$ generated by a preceding processing element can be provided to a buffer 322, which is used to implement the first de-interleaving. The de-interleaving can be achieved by either writing the symbols to, or reading the symbols from, buffer 322 in a permuted order that is complementary to the permutated order used at the transmitter unit to achieve the first interleaving. The de-interleaved symbols $y_n'$ are then provided to a de-rate-matching (DRM) element 324, which also receives the rate-matching attribute $RM_i$ assigned to the transport channel being processed. Rate-matching element 324 then computes the rate-matching parameters $\{X_i, e_{ini}, e_{plus}, \text{and } e_{minus}\}$ based in part on the rate-matching attribute. Rate-matching element 324 further performs symbol accumulation (if bit repetition was performed) or erasure insertion (if puncturing was performed) in accordance with a particular rate-matching pattern generated based on the computed rate-matching parameters. The de-rate-matched symbols $x_m'$ are then provided to a subsequent processing element (e.g., a decoder).

For clarity, the de-interleaving and rate-matching is now described for four difference cases: (1) bit repetition—transmitter unit, (2) symbol accumulation—receiver unit, (3) puncturing—transmitter unit, and (4) erasure insertion—receiver unit. Also, for clarity, the rate matching and first interleaving for each of the four cases is described for a specific example.

1. Bit Repetition—Transmitter Unit

FIGS. 4A and 4B are diagrams that illustrate the bits $x_m$ provided to rate-matching element 312 and the bits $y_n$ provided from the rate-matching element, respectively, for a specific example. In this example, 13 bits are included in the TTI of a transport channel, which is allocated 16 bits. Thus, three of the input bits are repeated. To perform the bit repetition, the rate-matching parameters (for conventional encoding) for this specific example are initially computed as: $X_i=13$, $e_{ini}=1$, $e_{plus}=26$, and $e_{minus}=6$. The bit repetition algorithm is then executed with the above-computed parameters, and it can be determined that the bits at positions m=1, 5, and 9 are to be repeated. Based on this repetition pattern, the rate-matched bits $Y_n$ are generated as shown in FIG. 4B.

FIG. 4C is a diagram of the first interleaving of the rate-matched bits for the example shown in FIGS. 4A and 4B. In this example, the TTI of the transport channel is 40 msec and the rate-matched bits $y_n$ are interleaved over four radio frames. In accordance with the W-CDMA standard, for a TTI of 40 msec, the bits $y_n$ are written into a rectangular (4-column) matrix row-by-row starting with the first column of the first row and ending with the last column of the last row. The columns are then rearranged in accordance with a particular inter-column permutation pattern (e.g., $\{0, 2, 1, 3\}$ for a TTI of 40 msec). The bits are then read from the matrix column-by-column.

Figure 4D:
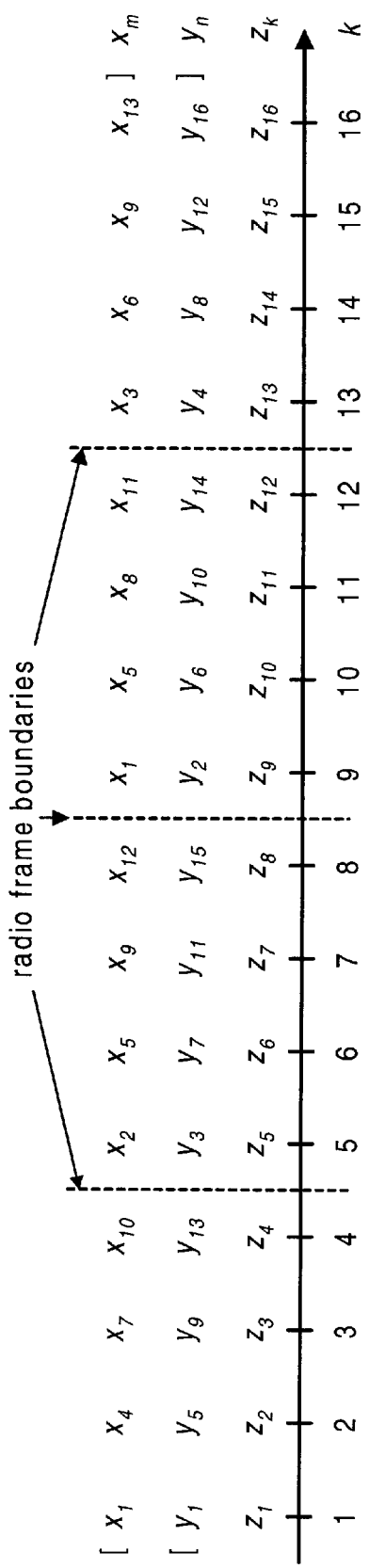

FIG. 4D is a diagram that illustrates the interleaved bits $z_k$ provided from first interleaver 314 after the first interleaving. FIG. 4D also shows the corresponding rate-matched bits $y_n$ and the original bits $x_m$. The interleaved bit sequence $\{z_1, z_2, z_3, \ldots, z_{16}\}$, which corresponds to the input bit sequence $\{x_1, x_4, x_7, \ldots, x_{13}\}$, is then provided to the subsequent processing element.

The rate-matching (bit repetition) and first interleaving can be achieved in various manners at the transmitter unit. In one implementation, for each TTI of each transport channel, the unmatched bits $x_m$ within the TTI are rate-matched (using bit repetition) based on the bit repetition algorithm described above. The rate-matched bits $y_n$ are then stored to first interleaver 314. To achieve the first interleaving, the rate-matched bits can be written to, or read from, first interleaver 314 in a permutated order. When an entire TTI of bits have been stored, the interleaved bits $z_k$ are then provided to the subsequent signal-processing element.

The index n of the rate-matched bit $y_n$ can be computed from the index m of the input bit $x_m$ based on the bit repetition algorithm described above. Alternatively, the index n can be computed directly from the index m, as described below. The direct computation of the index n from the index m may benefit the transmitter unit.

The benefits resulting from the direct computation can be illustrated by way of an example. For the above example, the encoder can initially generate the bit sequence $\{x_1, x_2, \ldots, x_{13}\}$. The transmitter unit can then recognize that, to construct the first radio frame, the interleaved bits $\{z_1, z_2, z_3, \text{ and } z_4\}$ are needed, which correspond the rate-matched bits $\{y_1, y_5, y_9, \text{ and } y_{13}\}$. The transmitter unit can then invoke a direct computation of n→m, and determines that $y_1=x_1$, $y_5=x_4$, $y_9=x_7$, and $y_{13}=x_{10}$. The transmitter unit then uses the input bits $\{x_1, x_4, x_7, \text{ and } x_{10}\}$ to form the first radio frame. The remaining radio frames are formed in similar manner. With the n→m (direct) computation, buffer 314 can be completely bypassed. Thus, the benefits of using the direct computation include the elimination of buffer 314 and time saving over the sequential computation.

Referring to the bit repetition algorithm described above, immediately before the line m=m+1, the value of the error e can be computed as:

$$0 < (e = e_{ini} - m \cdot e_{minus} + q \cdot e_{plus}) \le e_{plus}, \quad \text{Eq (1)}$$

where q is the number of repetitions up to that point (i.e., n=m+q). From equation (1), the last n such that $y_n = x_m$ can be expressed as:

$$n = m + f(m), \quad \text{Eq (2)}$$

where f(m)=q such that equation (1) is satisfied. It can be shown that:

$$f(m) = \left\lfloor \frac{-e_{ini} + m \cdot e_{plus}}{e_{plus}} \right\rfloor + 1.$$

Table 1 shows the computed rate-matched bit index n based on the unmatched bit index m for the example shown in FIGS. 4A and 4B. For Table 1, $y_n = x_m$ for n=m+f(m−1), n=m+f(m−1)+1, . . . , n=m+f(m). For a bit $x_m$, once the set of index n for the rate-matched bits is computed, another computation can be performed based on the index n to generate the index k for the first interleaving. The input bit $x_m$ can then be stored directly to location k in the buffer, as shown in Table 1. The above set of computations for the index n and k is executed once if the interleaving is performed while writing to the buffer.

TABLE 1

| m | f(m) | n | k | Action |
|---|---|---|---|---|
| 1 | 1 | 1 | 1 | store $x_1$ as $y_1$ to location 1 |
|   |   | 2 | 9 | repeat $x_1$ to location 9 |
| 2 | 1 | 3 | 5 | store $x_2$ as $y_3$ to location 5 |
| 3 | 1 | 4 | 13 | store $x_3$ as $y_4$ to location 13 |
| 4 | 1 | 5 | 2 | store $x_4$ as $y_5$ to location 2 |
| 5 | 2 | 6 | 10 | store $x_5$ as $y_6$ to location 10 |
|   |   | 7 | 6 | repeat $x_5$ to location 6 |
| 6 | 2 | 8 | 14 | store $x_6$ as $y_8$ to location 14 |
| 7 | 2 | 9 | 3 | store $x_7$ as $y_9$ to location 3 |
| 8 | 2 | 10 | 11 | store $x_8$ as $y_{10}$ to location 11 |
| 9 | 3 | 11 | 7 | store $x_9$ as $y_{11}$ to location 7 |
|   |   | 12 | 15 | repeat $x_9$ to location 15 |
| 10 | 3 | 13 | 4 | store $x_{10}$ as $y_{13}$ to location 4 |
| 11 | 3 | 14 | 12 | store $x_{11}$ as $y_{14}$ to location 12 |
| 12 | 3 | 15 | 8 | store $x_{12}$ as $y_{15}$ to location 8 |
| 13 | 3 | 16 | 16 | store $x_{13}$ as $y_{16}$ to location 16 |

2. Symbol Accumulation—Receiver Unit

Figure 5:
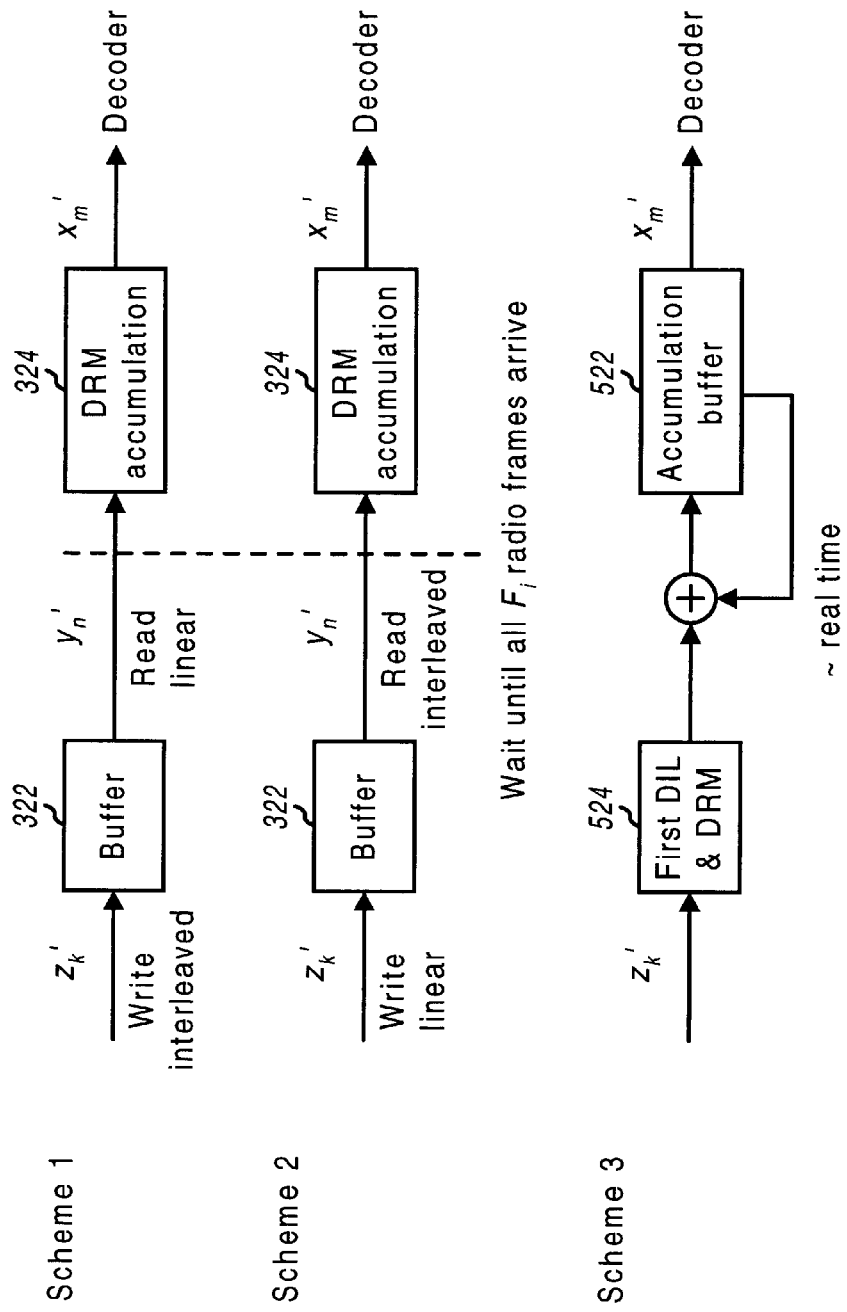
FIG. 5 is a diagram that illustrates various schemes to achieve the first de-interleaving and de-rate-matching (symbol accumulation) at the receiver unit.

FIG. 5 is a diagram that illustrates various schemes to achieve the first de-interleaving and de-rate-matching (symbol accumulation) at the receiver unit. In the first and second schemes, the de-interleaving and de-rate-matching are performed separately and sequentially. For each TTI of each transport channel, all symbols $z_k'$ for the TTI are received and stored to the buffer. In the first scheme, to achieve the first de-interleaving, the received symbols $z_k'$ are written to the buffer in a permutated order. When the entire TTI of de-interleaved symbols is available, the symbols $y_n'$ are read from the buffer in a linear order and de-rate-matching is then performed on the de-interleaved symbols $y_n'$ to provide the de-rate-matched symbols $x_m'$. In the second scheme, to achieve the first de-interleaving, the received symbols $z_k'$ are written to the buffer in a linear order and read from in a permutated order to achieve the first de-interleaving. In these schemes, an entire TTI of symbols is stored to achieve the de-interleaving, and the de-rate-matching is not initiated until the entire TTI of symbols has been received and de-interleaved.

The first and second schemes may require a large buffer to store the received symbols $z_k'$, especially if the repetition factor is high. (The W-CDMA standard does not place a limit on the repetition factor.) Moreover, these schemes may result in longer processing delays since the de-rate-matching is not initiated until the entire TTI of symbols have been received and stored.

The invention provides various techniques to improve the de-interleaving and de-rate-matching (symbol accumulation). In accordance with an aspect of the invention, the de-rate-matching is performed on the received symbols $z_k'$ approximately in real time as these symbols are received from the preceding processing element or as they are provided to a subsequent processing element. In accordance with another aspect of the invention, the de-interleaving and de-rate-matching are performed concurrently when storing the symbols such that de-rate-matched and de-interleaved symbols are stored to the buffer. These processing techniques may allow for the use of a smaller buffer to store the de-rate-matched symbols $x_m'$ and may further reduce the processing delays.

In the third scheme shown in FIG. 5, the received symbols $z_k'$ are de-interleaved and de-rate-matched by a de-interleaving and de-rate-matching element 524, which determines the locations in a buffer 522 to which the symbols should be stored or accumulated. The symbols $z_k'$ are then stored to, or accumulated with values previously stored in, the determined locations. In this scheme, the de-interleaving and de-rate-matching can be performed in real time as the symbol $z_k'$ are received. Also, by storing accumulated results, the required buffer size may be reduced.

For clarity, various aspects of the invention are now described in context of the first scheme, although the processing generally also applies to the second and third schemes. Referring back to FIG. 4D, the received symbols $z_1', z_2', z_3', \ldots,$ and $z_{16}'$, can be provided to the buffer in a particular permutated order to achieve the first de-interleaving. Each received symbol $z_k'$ at time index k can be written to a particular location n the buffer such that stored symbols can be retrieved from sequential locations of the buffer to achieve the first de-interleaving (i.e., for schemes 1 and 3 in FIG. 5). The relationship between the buffer location n and the received symbol index k can be expressed as:

$$n = F_i((k-1) \bmod N_i) + h, \quad \text{Eq (3)}$$

where $F_i$ is the number of radio frames in the TTI (i.e., $F_i$=1, 2, 4, and 8 for TTIs of 10, 20, 40, and 80 msec, respectively), k is the index of the received symbol $z_k'$, $N_i$ is the number of received symbols in each radio frame, and h is constant that is dependent on the inter-column permutation pattern for the TTI. For example, for a TTI of 40 msec, the inter-column permutation pattern is {0, 2, 1, 3} and h is equal to 1, 3, 2, and 4 for the first, second, third, and fourth radio frames in the TTI, respectively. To achieve the de-interleaving, the received symbol $z_k'$ can be written to location n of the buffer (i.e., b[n]), with n being computed as shown in equation (3).

For the specific example shown in FIG. 4D, $F_i$=4 and $N_i$=4. The received symbols $z_1', z_2', z_3', \ldots,$ and $z_{16}'$ can be respectively written to locations n=1, 5, 9, 13, . . . , and 16 of the buffer. In this manner, the de-interleaved symbols $y_1', y_2', y_3', \ldots, y_{16}'$ can be retrieved by reading from sequential locations 1, 2, 3, . . . 16, respectively, of the buffer.

In accordance with an aspect of the invention, the de-rate-matching is also performed on the received symbols $z_k'$ as they are provided to the buffer (for scheme 3 in FIG. 5). As noted above, the received symbols $z_k'$ can be stored to permutated locations in the buffer to achieve the first de-interleaving. For each symbol $z_k'$, the (de-interleaved) location n of the buffer can be computed based on equation (3). However, instead of storing the received symbol $z_k'$ to location n (which would become de-interleaved symbol $y_n'$), the de-rate-matching is also performed on that symbol. From the de-interleaved location n, a determination can be made of the location m where the symbol $z_k'$ should be provided to achieve the de-rate-matching. Specifically, if bit repetition was performed, a determination can be made of the location m where the symbol $z_k'$ should be stored or accumulated with a previously stored symbol.

Storing the de-rate-matched symbols $x_m'$ (as oppose to the de-interleaved symbols $y_n'$) can provide various advantages. For example, the required size of the buffer may be reduced if symbol accumulation is being performed. Also, storing de-rate-matched symbols $x_m'$ may result in less processing delays and may further simplify the subsequent processing, as described in further detail below.

In one de-rate-matching embodiment, a symbol accumulation algorithm is executed once for each radio frame to undo the bit repetition performed at the transmitter unit.

Referring back to FIG. 4D, the symbols $y_n'$ are received in a permutated order when the TTI is greater than 10 msec. For the example shown in FIG. 4D in which the TTI is 40 msec, the received symbols $z_k'$, $z_2'$, $z_3'$, . . . , and $z_{16}'$ correspond to the de-interleaved symbols $y_1'$, $y_5'$, $y_9'$, . . . , and $y_{16}'$, respectively, which cover four radio frames. The symbol accumulation algorithm can be executed once to undo the repetition for symbols $z_1'$, $z_2'$, $z_3'$, and $z_4'$ in the first radio frame, which correspond to de-interleaved symbols $y_1'$, $y_5'$, $y_9'$, and $y_{13}'$, respectively. The algorithm can then be executed a second time to undo the repetition for symbols $z_5'$, $z_6'$, $z_7'$, and $z_8'$ in the second radio frame, which correspond to de-interleaved symbols $y_3'$, $y_7'$, $y_{11}'$, and $y_{15}'$, respectively. The algorithm can be executed again for each remaining radio frame in the TTI.

The symbol accumulation algorithm is complementary to the bit repetition algorithm, and can be provided as:

de-interleaved symbol $y_n'$), m represents the location in the buffer to which the symbol $z_k'$ (i.e., $y_n'$) should be stored or accumulated to achieve the de-rate-matching (i.e., m is the index of the de-rate-matched symbol $x_m'$), and $Y_1$ is the number of received symbols in the TTI.

The de-interleaving and de-rate-matching (for the third scheme, based on the symbol accumulation algorithm) can be achieved as follows. At the start of each radio frame of a particular TTI, prior to the reception of the first symbol for the radio frame, the variables e, m, and n' are set to their respective initial values. Thereafter, for each received symbol $z_k'$ at time index k, a determination is made as to the buffer location n where the symbol should be stored to achieve the first de-interleaving. The buffer index n can be computed from the time index k based on equation (3). Storing the symbol $z_k'$ to location n would only achieve the first de-interleaving. To also achieve the de-rate-matching, the symbol accumulation algorithm is executed until it can be determined the location m where the symbol $y_n'$ should be stored or accumulated. The symbol $z_k'$ is then stored to location m or accumulated with the symbol already stored at that location.

As noted above, the symbol accumulation algorithm can be executed once for each radio frame to achieve the de-rate-matching. Prior to the start of the radio frame, the variables e, m, and n' are initialized. For each received symbol $z_k'$, the de-interleaved location n is determined and the algorithm is executed until that symbol is either stored to location m in the buffer or accumulated with the value at that location. The algorithm is then temporarily halted until the next symbol is received. A program pointer can be used to maintain track of where the algorithm was halted so that execution of the algorithm can later be resumed from where it was halted.

Table 2 shows the variables in the symbol accumulation algorithm and the action performed for each symbols $y_n'$ for the example shown in FIGS. 4A through 4D. The algorithm is executed four times for a TTI of 40 msec, with the same set of results being obtained for the variables n', m, and e each time the algorithm is executed. However, the symbol storage or accumulation is only performed for the symbols actually received in that radio frame. For the first radio frame, the four symbols $z_1'$, $z_2'$, $z_3'$, and $z_4'$ (i.e., $y_1'$, $y_5'$, $y_9'$, and $y_{13}'$) are stored to locations 1, 4, 7, and 10, respectively.

--- symbol accumulation algorithm

| | |
|---|---|
| $e = e_{ini}$ -- | set initial value for error e |
| m = 1 -- | initialize pointer m to first buffer location |
| n' = 1 -- | set initial value for index n' |
| do while (n' $\leq$ $y_i$) | |
|    if (n = n') then -- | check if symbol $y_n'$ should be stored |
|       store symbol $y_n'$ to location m | |
|    end if | |
|    $e = e - e_{minus}$ -- | update error e |
|    do while (e $\leq$ 0) -- | check if a bit was repeated |
|       n' = n' + 1 -- | update index n' |
|       if (n = n') then -- | check if symbol $y_n'$ should be accumulated |
|          accumulate symbol $y_n'$ to location m | |
|       end if | |
|       $e = e + e_{plus}$ -- | update error e after an accumulation |
|    end do | |
|    m = m + 1 -- | update pointer m to next buffer location |
|    n' = n' + 1 -- | update index n' |
| end do | |

---

In the above symbol accumulation algorithm, n' represents a counting index, n represents the computed de-interleaved index for the received symbol $z_k'$ (i.e., n is the location where the symbol $z_k'$ should be stored to obtain the For the second radio frame, the symbols $z_5'$, $z_6'$, $z_7'$, and $z_8'$ (i.e., $y_3'$, $y_7'$, $y_{11}'$, and $y_{15}'$) are stored to locations 2, 5, 9, and 12, respectively. For the third radio frame, the symbols $z_9'$ and $z_{10}'$, (i.e., $y_2'$ and $y_6'$) are respectively accumulated with the symbols stored in locations 1 and 5, and the symbols $z_{11}'$ and $z_{12}'$ (i.e., $y_{10}'$ and $y_{14}'$) are respectively stored to locations 8 and 11. And for the fourth radio frame, the symbols $z_{13}'$, $z_{14}'$, and $z_{16}'$ (i.e. $y_4'$, $y_8'$, and $y_{16}'$) are respectively stored to locations 3, 6, and 13, and the symbol $z_{15}'$ (i.e., $y_{12}'$) is accumulated with the symbol stored in location 9.

TABLE 2

| k | n' | m | e | Radio frame | Action |
|---|----|---|---|-------------|--------|
| 1 | 1 | 1 | 1 | 1 | store $y_1'$ ($z_1'$) to location 1 |
| 9 | 2 |   | -5 | 3 | accumulate $y_2'$ ($z_9'$) to location 1 |
| 5 | 3 | 2 | 21 | 2 | store $y_3'$ to ($z_5'$) location 2 |
| 13 | 4 | 3 | 15 | 4 | store $y_4'$ to ($z_{13}'$) location 3 |
| 2 | 5 | 4 | 9 | 1 | store $y_5'$ to ($z_2'$) location 4 |
| 10 | 6 | 5 | 3 | 3 | accumulate $y_6'$ to ($z_{10}'$) location 5 |
| 6 | 7 |   | -3 | 2 | store $y_7'$ ($z_6'$) to location 5 |
| 14 | 8 | 6 | 23 | 4 | store $y_8'$ ($z_{14}'$) to location 6 |
| 3 | 9 | 7 | 17 | 1 | store $y_9'$ ($z_3'$) to location 7 |
| 11 | 10 | 8 | 11 | 3 | store $y_{10}'$ ($z_{11}'$) to location 8 |
| 7 | 11 | 9 | 5 | 2 | store $y_{11}'$ ($z_7'$) to location 9 |
| 15 | 12 |   | -1 | 4 | accumulate $y_{12}'$ ($z_{15}'$) to location 9 |
| 4 | 13 | 10 | 25 | 1 | store $y_{13}'$ ($z_4'$) to location 10 |
| 12 | 14 | 11 | 19 | 3 | store $y_{14}'$ ($z_{12}'$) to location 11 |
| 8 | 15 | 12 | 13 | 2 | store $y_{15}'$ ($z_8'$) to location 12 |
| 16 | 16 | 13 | 7 | 4 | store $y_{16}'$ ($z_{16}'$) to location 13 |

Figure 4E:
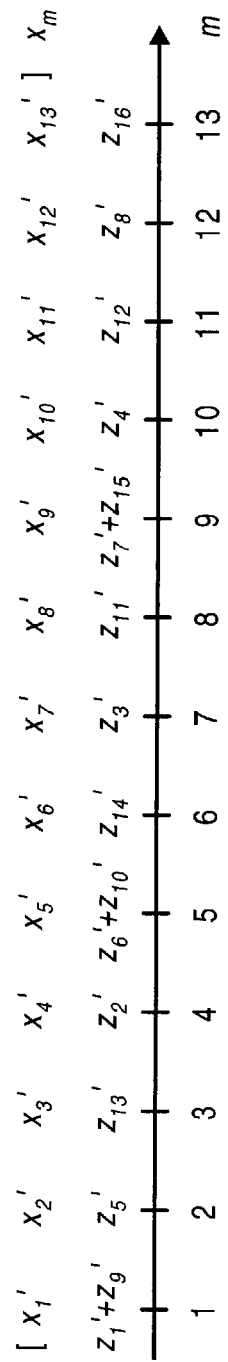

FIG. 4E is a diagram of the symbols $x_m'$ stored in the buffer to achieve the first de-interleaving and de-rate-matching. The horizontal axis represents the index m of the buffer. As shown in FIG. 4E, the first de-rate-matched symbol $x_1'$ is generated by accumulating the received symbols $z_1'$ and $z_9'$, the second de-rate-matched symbol $x_2'$ is the symbol $z_5'$, the third de-rate-matched symbol $x_3'$ is the symbol $z_{13}'$, and so on.

In another de-rate-matching (symbol accumulation) embodiment, which is applicable for all three schemes shown in FIG. 5, the index m of the de-rate-matched symbol $x_m'$ is directly computed from the index n of the de-interleaved symbol $y_n'$, which is computed from the index k of the received symbol $z_k'$ in accordance with equation (3). The direct computation of the index m from the index n can reduce the processing delays. For example, if the TTI is $F_i \cdot 10$ msec, the time it takes to rate-match the last radio frame in the TTI may be reduced by a factor of $F_i$ using the direct computation as compared to the sequential computation provided by the symbol accumulation algorithm.

Referring to the bit repetition algorithm described above, at the end of the "end do" line, the value of the error e can be expressed as shown in equation (1). The de-rate-matched index m can be computed from the rate-matching parameters $e_{ini}$, $e_{plus}$, and $e_{minus}$, and the de-interleaved index n in accordance with the following expression:

$$m = \left\lceil \frac{e_{plus} \cdot (n-1) + e_{ini}}{e_{plus} + e_{minus}} \right\rceil, \quad \text{Eq (4)}$$

where "$\lceil \ \rceil$" is a ceiling operator (e.g., $\lceil 5.21 \rceil = 6$).

For the specific example described above, for the first radio frame, the indices n=1, 5, 9, and 13 result in values of $\lceil -0.781 \rceil$, $\lceil 2.47 \rceil$, $\lceil 5.72 \rceil$, and $\lceil 8.971 \rceil$, respectively, which are equal to the indices m=1, 4, 7, and 10, respectively.

For both de-rate-matching embodiments described above (using the symbol accumulation algorithm and direct computation), the symbol accumulation can be performed "in place". The received symbols $z_k'$ are directly stored to the de-rate-matched locations m or accumulated with the symbols already stored in these locations. Storing the accumulated results can reduce the buffer requirement since only one (accumulated) symbol is stored for each bit. Also, the de-rate-matched symbols $x_m'$ can thereafter be retrieved from sequential locations of the buffer, which can simplify the operation of the buffer.

Figure 6:
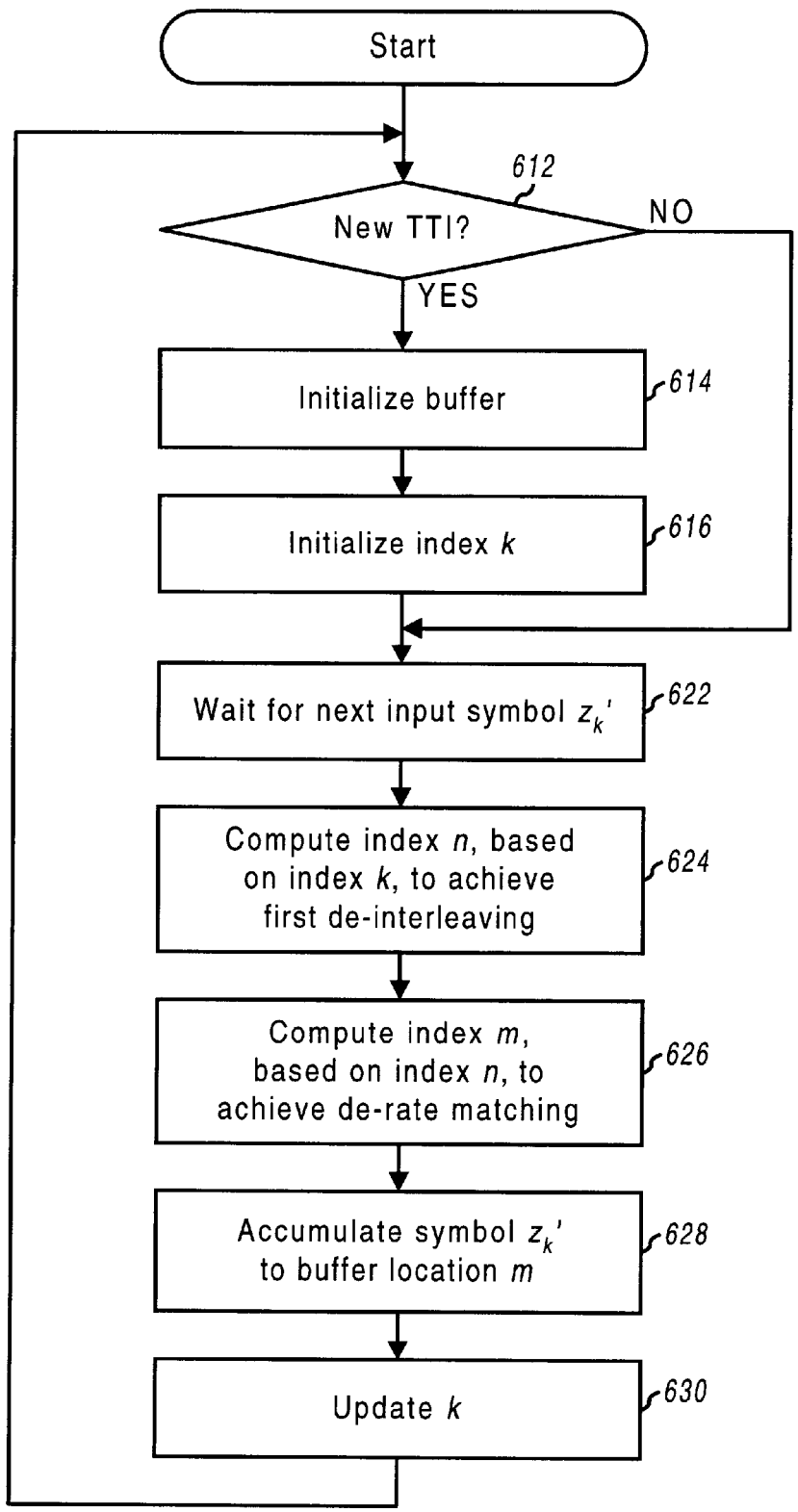
FIG. 6 is a flow diagram of a process to achieve the first de-interleaving and de-rate-matching (symbol accumulation) in accordance with an embodiment of the invention.

FIG. 6 is a flow diagram of a process to achieve the first de-interleaving and de-rate-matching (symbol accumulation) of the received symbols $z_k'$ in accordance with an embodiment of the invention. Initially, a determination is made whether a new TTI is being received for the transport channel, at step 612. If a new TTI is being received, the buffer is initialized (e.g., to all zeros, if symbol accumulation is being performed), at step 614, and the index k is also initialized (e.g., to zero), at step 616. If a new TTI is not being received or after the buffer and index k have been initialized, the process waits for receipt of an input symbol $z_k'$, at step 622.

Upon receipt of the symbol $z_k'$, the index n to achieve the first de-interleaving is computed based on the index k of the received symbol, at step 624. The index m to achieve the de-rate-matching (symbol accumulation) is then computed based on the computed de-interleaved index n, at step 626. The computation for the index m can be achieved directly from the index n based on equation (4) or can be computed using the symbol accumulation algorithm described above. The symbol $z_k'$ is then accumulated to location m in the buffer, at step 628. Since the buffer has been initialized with zeros prior to the start of the TTI, at step 614, the symbol $z_k'$ can be stored to location m in the buffer by accumulating it with the initial zero value. The index k is then incremented, at step 630. The process returns to step 612 and other symbols $z_k'$ in the TTI are processed in similar manner.

3. Puncturing—Transmitter Unit

The techniques described above for bit repetition may also be applied for puncturing. For clarity, the rate matching (e.g., puncturing) and first interleaving at the transmitter unit is now described for a specific example. In this example, 18 bits are included in the TTI of the transport channel, which is also allocated 16 bits. Thus, two of the input bits are punctured.

Figure 7A:
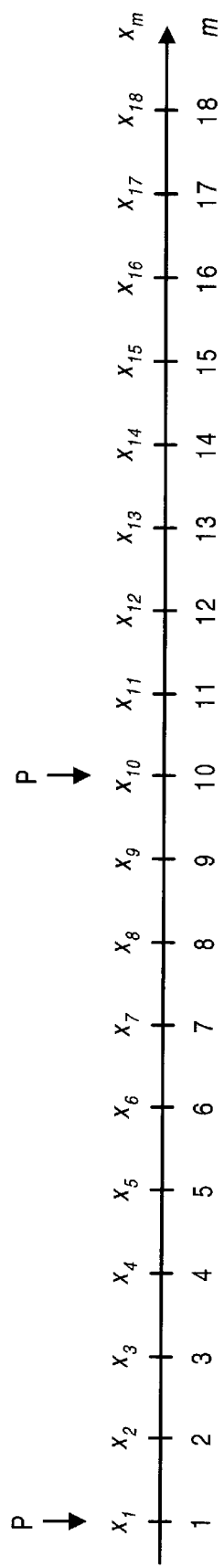
Figure 7B:
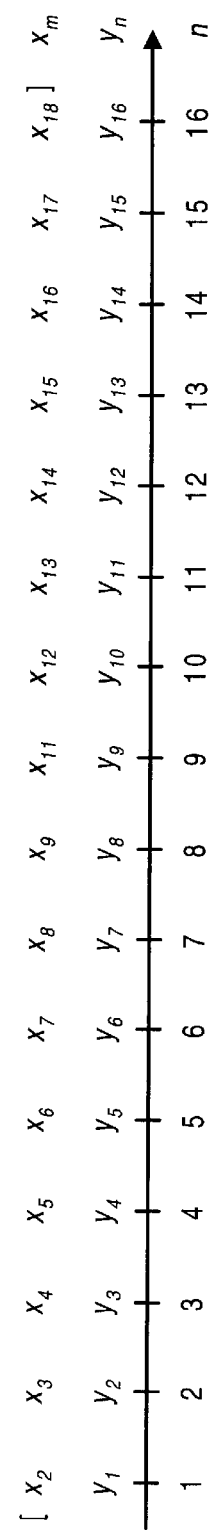

FIGS. 7A and 7B are diagrams that illustrate the bits $x_m$ provided to rate-matching element 312 and the bits $y_n$ provided from rate-matching element 312, respectively, for a specific example. To perform puncturing, the rate-matching parameters (for conventional encoding) are initially computed as: $X_i = 18$, $e_{ini} = 1$, $e_{plus} = 36$, and $e_{minus} = 4$. The puncturing algorithm described above is then executed with the above-computed parameters, and it can be determined that the bits at positions m=1 and 10 are to be punctured. Based on this puncturing pattern, the rate-matched bits $y_n$ are generated as shown in FIG. 7B.

Figures 7C, 7D:
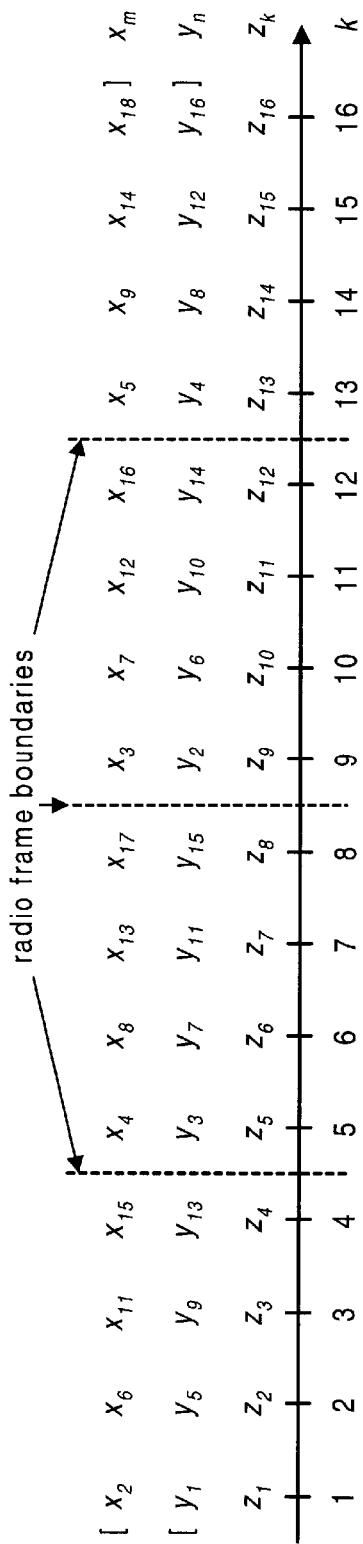

FIG. 7C is a diagram of the first interleaving of the rate-matched bits for the example shown in FIG. 7A. In this example, the TTI of the transport channel is also 40 msec and the rate-matched bits $y_n$ are interleaved over four radio frames. Again, the bits $y_n$ are written into a rectangular (4-column) matrix row-by-row. The columns are then rearranged in accordance with the inter-column permutation pattern {0, 2, 1, 3}. The bits are then read from the matrix column-by-column.

FIG. 7D is a diagram that illustrates the bits $z_k$ provided from first interleaver 314 after the first interleaving. FIG. 7D also shows the corresponding rate-matched bits $y_n$ and the original bits $x_m$. The interleaved bit sequence $\{z_1, z_2, z_3, \ldots, z_{16}\}$, which corresponds to the input bit sequence $\{x_2, x_6, x_{11}, \ldots x_{18}\}$, is then provided to the subsequent processing element.

The rate-matching (puncturing) and first interleaving can also be achieved in various manners at the transmitter unit. In one implementation, for each TTI of each transport channel, the bits $x_m$ within the TTI are received and rate-matching is performed based on the puncturing algorithm described above. The rate-matched bits $y_n$ are then stored to first interleaver 314.

The index n of the rate-matched bit $y_n$ can be computed from the index m of the input bit $x_m$ based on the sequential puncturing algorithm described above. Alternatively, the index n can be directly computed from the index m, as described below. Referring to the puncturing algorithm described above, at the line "end if", the value of the error e can be computed as:

$$0 < (e = e_{ini} - m \cdot e_{minus} + p \cdot e_{plus}) \leq e_{plus}, \quad \text{Eq (5)}$$

where p is the number of punctures up to the $m^{th}$ bit. From equation (5), a function $f(m) = p$ can be defined such that equation (5) is satisfied. The function $f(m)$ can be expressed as:

$$f(m) = \left\lfloor \frac{m \cdot e_{minus} - e_{ini}}{e_{plus}} \right\rfloor + 1, \quad \text{Eq (6)}$$

where "$\lfloor \ \rfloor$" is a floor operator (i.e., $\lfloor 5.2 \rfloor = 5$). If $f(m) > f(m-1)$, then the input bit $x_m$ is punctured. Otherwise, $y_n = x_m$, where $n = m - f(m)$.

Table 3 shows the computed rate-matched symbol index n based on the input symbol index m for the example shown in FIGS. 7A and 7B. For Table 3, $f(m)$ is computed as shown in equation (6) with the rate-matching parameters: $X_i = 18$, $e_{ini} = 1$, $e_{plus} = 36$, and $e_{minus} = 4$. Once the index n for the rate-matching is computed, another computation can be performed based on the index n to generate the index k for the first interleaving. The input bit $x_m$ can then be stored directly to location k in the buffer, as shown in Table 3.

TABLE 3

| m | f(m) | n | k | Action |
|---|---|---|---|---|
| 1 | 0 | | | puncture bit $x_1$ |
| 2 | 0 | 1 | 1 | store $x_2$ as $y_1$ to location 1 |
| 3 | 0 | 2 | 9 | store $x_3$ as $y_2$ to location 9 |
| 4 | 0 | 3 | 5 | store $x_4$ as $y_3$ to location 5 |
| 5 | 0 | 4 | 13 | store $x_5$ as $y_4$ to location 13 |
| 6 | 0 | 5 | 2 | store $x_6$ as $y_5$ to location 2 |
| 7 | 0 | 6 | 10 | store $x_7$ as $y_6$ to location 10 |
| 8 | 0 | 7 | 6 | store $x_8$ as $y_7$ to location 6 |
| 9 | 0 | 8 | 14 | store $X_9$ as $y_8$ to location 14 |
| 10 | 1 | | | puncture bit $x_{10}$ |
| 11 | 1 | 9 | 3 | store $x_{11}$ as $y_9$ to location 3 |
| 12 | 1 | 10 | 11 | store $x_{12}$ as $y_{10}$ to location 11 |
| 13 | 1 | 11 | 7 | store $x_{13}$ as $y_{11}$ to location 7 |
| 14 | 1 | 12 | 15 | store $x_{14}$ as $y_{12}$ to location 15 |
| 15 | 1 | 13 | 4 | store $x_{15}$ as $y_{13}$ to location 4 |
| 16 | 1 | 14 | 12 | store $x_{16}$ as $y_{14}$ to location 12 |
| 17 | 1 | 15 | 8 | store $x_{17}$ as $y_{15}$ to location 8 |
| 18 | 1 | 16 | 16 | store $x_{18}$ as $y_{16}$ to location 16 |

4. Erasure Insertion—Receiver Unit

Figure 8:
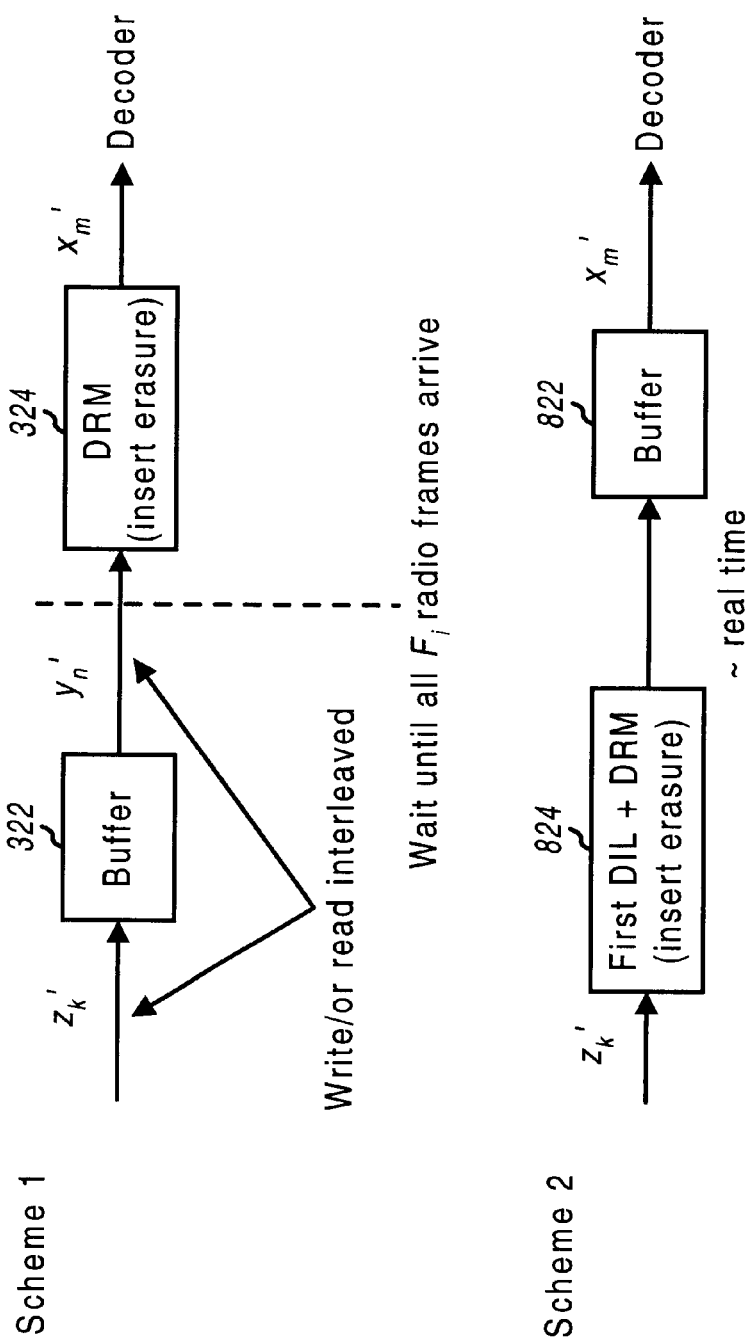
FIG. 8 is a diagram that illustrates various schemes to achieve the first de-interleaving and de-rate-matching (erasure insertion) at the receiver unit.

FIG. 8 is a diagram that illustrates various schemes to achieve the first de-interleaving and de-rate-matching (erasure insertion) at the receiver unit. In the first scheme, the received symbols $z_k'$ can be written to the buffer in a permutated order and read from the buffer in a linear order to achieve the first de-interleaving. Alternatively, the received symbols $z_k'$ can be written to the buffer in a linear order and read from the buffer in a permutated order to achieve the first de-interleaving. When the entire TTI of de-interleaved symbols is available, the symbols $y_n'$ are provided from the buffer in the proper (either linear or permutated) order and de-rate-matching is then performed on the de-interleaved symbols $y_n'$ to provide the de-rate-matched symbols $x_m'$. Erasures can be inserted during the de-rate-matching.

In the second scheme, the received symbols $z_k'$ are de-interleaved and de-rate-matched by a de-interleaving and de-rate-matching element 824, which determines the locations in a buffer 822 to which the symbols should be stored. The symbols $z_k'$ are then stored to the determined locations. Erasures are also stored in buffer 822 such that de-rate-matched symbols $x_m'$ can be retrieved from buffer 822 by reading in a particular (e.g., linear) order. This scheme may reduce processing delays but requires a larger buffer size compared to scheme 1 since erasures are also stored. For both schemes, the indices for the de-rate-matching can be determined by a sequential or direct computation, as described below.

Referring back to FIG. 7D, the received symbols $z_1'$, $z_2'$, $z_3'$, ..., and $z_{16}'$ can be provided to the buffer in a particular permutated order to achieve the first de-interleaving (i.e., for schemes 1 and 2 in FIG. 8). The received symbols $z_k'$ at time indices k can be written to particular locations n in the buffer such that the stored symbols can be retrieved from sequential locations of the buffer to achieve the first de-interleaving. The relationship between the buffer location n and the index k to achieve the first de-interleaving can be expressed as shown in equation (3). For the specific example shown in FIG. 7D, the received symbols $z_1'$, $z_2'$, $z_3'$, $z_4'$, and so on, can be written to locations n=1, 5, 9, 13, and so on, respectively, of the buffer. In this manner, the de-interleaved symbols $y_1'$, $y_2'$, $y_3'$, ..., $y_{16}'$ can be retrieved by reading from sequential locations 1, 2, 3, ... 16, respectively, of the buffer.

In an embodiment, corresponding to the second scheme described above, the de-rate-matching (erasure insertion) is also performed on the received symbols $z_k'$ as they are provided to the buffer. As noted above, the received symbols $z_k'$ can be stored to permutated locations in the buffer to achieve the first de-interleaving. For each symbol $z_k'$, the (de-interleaved) location n of the buffer can be computed based on equation (3). However, instead of storing the received symbol $z_k'$ to location n (which would only achieve the first de-interleaving), the de-rate-matching can also be performed on that symbol. From the computed de-interleaved location n, a determination can be made of the location m where the symbol $z_k'$ should be stored or an erasure should be inserted (in which case the symbol $z_k'$ would be stored to location m+1). Again, storing the de-rate-matched symbols $x_m'$ (as oppose to the de-interleaved symbols $y_n'$) may provide reduced processing delays, as described below.

In one de-rate-matching embodiment, which is applicable for both schemes shown in FIG. 8, an erasure insertion algorithm is executed once for each radio frame to undo the puncturing performed at the transmitter unit.

Referring back to FIG. 7D, the symbols $y_n'$ are received in a permutated order when the TTI is greater than 10 msec.

For the example shown in FIG. 7D in which the TTI is 40 msec, the received symbols $z^1$, $z_2$, $z_3'$, ..., and $z_{16}'$ correspond to the de-interleaved symbols $y_1'$, $y_5'$, $y_9'$, ..., and $y_{16}'$, respectively, which cover four radio frames. The erasure insertion algorithm can be executed once to "undo" the puncturing for symbols $z_1'$, $z_2'$, $z_3'$, and $z_4'$ in the first radio frame, which correspond to de-interleaved symbols $y_1'$, $y_5'$, $y_9'$, and $y_{13}'$, respectively. The algorithm can then be executed a second time to undo the puncturing for symbols $z_5'$, $z_6'$, $z_7'$, and $z_8'$ in the second radio frame, which correspond to de-interleaved symbols $y_3'$, $y_7'$, $y_{11}'$, and $y_{15}'$, respectively. The algorithm can be executed again for each remaining radio frame in the TTI.

The erasure insertion algorithm is complementary to the puncturing algorithm, and can be provided as:

--- erasure insertion algorithm

```
e = e_ini --                set initial value for error e
m = 1 --                    initialize pointer m to first buffer location
n' = 1 --                   set initial value for index n'
do while (n' ≤ y_i)
    e = e - e_minus --      update error e
    if (e ≤ 0) --           check if a bit was punctured
        insert erasure at location m
        m = m + 1 --        update pointer m to next buffer location
        e = e + e_plus --   update error e after insertion of erasure
    end do
    if (n = n') then --     check if symbol y_n' should be stored
        store symbol y_n' to location m
    end if
    m = m + 1 --            update pointer m to next buffer location
    n' = n' + 1 --          update index n'
end do
```

---

In the above erasure insertion algorithm, n' represents a counting index, n represents the computed de-interleaved index for the received symbol $z_k'$ (i.e., the location where the symbol $z_k'$ should be stored to achieve the first de-interleaving), m represents the location in the buffer to which an erasure should be inserted (for a punctured bit) or the symbol $z_k'$ should be stored to achieve the de-rate-matching, and $Y_i$ is the number of received symbols in the TTI.

The de-interleaving and de-rate-matching (for the second scheme, based on the erasure insertion algorithm) can be achieved as follows. At the start of each radio frame of a particular TTI, prior to the reception of the first symbol for the radio frame, the variables e, m, and n' are set to their respective initial values. Thereafter, for each received symbol $z_k'$ at time index k, a determination is made as to the buffer location n where the symbol should be stored to achieve the first de-interleaving. The buffer index n can be computed from the index k based on equation (3). Storing the symbol $z_k'$ to location n would only achieve the first de-interleaving. To also achieve the de-rate-matching, the erasure insertion algorithm is executed until it can be determined the location m where an erasure should be inserted or the symbol $z_k'$ should be stored. If the allocated section of the buffer is initialized to zero ("0"), then erasures are pre-inserted in the buffer. The symbol $z_k'$ is then stored to the determined location.

As noted above, the erasure insertion algorithm can be executed once for each radio frame to achieve the de-rate-matching. For each received symbol $z_k'$, the de-interleaved location n is determined and the algorithm is executed until that symbol is stored to location m in the buffer. The algorithm is then temporarily halted until the next symbol is received. A program pointer can be used to maintain track of where the algorithm was halted so that execution can later resume from the proper location.

Table 4 shows the variables in the symbol accumulation algorithm and the action performed for each symbols $y_n'$ for the example shown in FIGS. 7A through 7D. The algorithm is executed four times for a TTI of 40 msec, with the same set of results being obtained for the variables n', m, and e each time the algorithm is executed. However, the symbol storage is only performed for the symbols actually present in that radio frame. For the first radio frame, the four symbols $y_1'$, $y_5'$, $y_9'$, and $y_{13}'$ are stored to locations 2, 6, 11, and 15, respectively, are erasures are inserted at locations 1 and 10. For the second radio frame, the symbols $y_2'$, $y_6'$, $y_{10}'$, and $y_{14}'$ are stored to locations 3, 7, 12, and 16, respectively. For the third radio frame, the symbols $y_1'$, $y_5'$, $y_9'$, and $y_{13}'$ are stored to locations 2, 6, 11, and 15, respectively. And for the fourth radio frame, the symbols $y_3'$, $y_7'$, $y_{11}'$, and $y_{15}'$ are stored to locations 4, 8, 13, and 17, respectively.

TABLE 4

| k | n' | m | e | Radio frame | Action |
|---|---|---|---|---|---|
|   | 1 | 1 | 1 | 1 | insert erasure at location 1 |
| 1 | 1 | 2 | 33 | 1 | store $y_1'$ ($z_1'$) to location 2 |
| 9 | 2 | 3 | 29 | 3 | store $y_2'$ ($z_9'$) to location 3 |
| 5 | 3 | 4 | 25 | 2 | store $y_3'$ ($z_5'$) to location 4 |
| 13 | 4 | 5 | 21 | 4 | store $y_4'$ ($z_{13}'$) to location 5 |
| 2 | 5 | 6 | 17 | 1 | store $y_5'$ ($z_2'$) to location 6 |
| 10 | 6 | 7 | 13 | 3 | store $y_6'$ ($z_{10}'$) to location 7 |
| 6 | 7 | 8 | 9 | 2 | store $y_7'$ ($z_6'$) to location 8 |
| 14 | 8 | 9 | 5 | 4 | store $y_8'$ ($z_{14}'$) to location 9 |
|   | 9 | 10 | 1 | 1 | insert erasure at location 10 |
| 3 | 9 | 11 | 33 | 1 | store $y_9'$ ($z_3'$) to location 11 |
| 11 | 10 | 12 | 29 | 3 | store $y_{10}'$ ($z_{11}'$) to location 12 |
| 7 | 11 | 13 | 25 | 2 | store $y_{11}'$ ($z_7'$) to location 13 |
| 15 | 12 | 14 | 21 | 4 | store $y_{12}'$ ($z_{11}'$) to location 14 |
| 4 | 13 | 15 | 17 | 1 | store $y_{13}'$ ($z_4'$) to location 15 |
| 12 | 14 | 16 | 13 | 3 | store $y_{14}'$ ($z_{12}'$) to location 16 |
| 8 | 15 | 17 | 9 | 2 | store $y_{15}'$ ($z_8'$) to location 17 |
| 16 | 16 | 18 | 5 | 4 | store $y_{16}'$ ($z_{16}'$) to location 18 |

In another de-rate-matching (erasure insertion) embodiment, which is applicable for both schemes in FIG. 8, the index m of the de-rate-matched symbol $x_m'$ is directly computed from the index n of the de-interleaved symbol $y_n'$, which is computed from the index k of the received symbol $z_k'$. Again, the direct computation of the index m from the index n can reduce the processing delays.

Referring to the puncturing algorithm described above, at the end of the "end if" line, the value of the error e can be expressed as shown in equation (5). The de-rate-matched index m can be computed from the rate-matching parameters $e_{ini}$, $e_{plus}$, and $e_{minus}$, and the de-interleaved index n in accordance with the following expression:

$$m = \left\lceil \frac{n \cdot e_{plus} - e_{ini}}{e_{plus} - e_{minus}} \right\rceil. \qquad \text{Eq (7)}$$

For the specific example described above in which $X_i$18, $e_{ini}$=1, $e_{plus}$=36, and $e_{minus}$=4, for the first radio frame, the indices n=1, 5, 9, and 13 result in values of ⌈1.09⌉, ⌈5.59⌉, ⌈10.09⌉, and ⌈14.59⌉, respectively, which are equal to the indices m=2, 6, 11, and 15, respectively.

Figure 9:
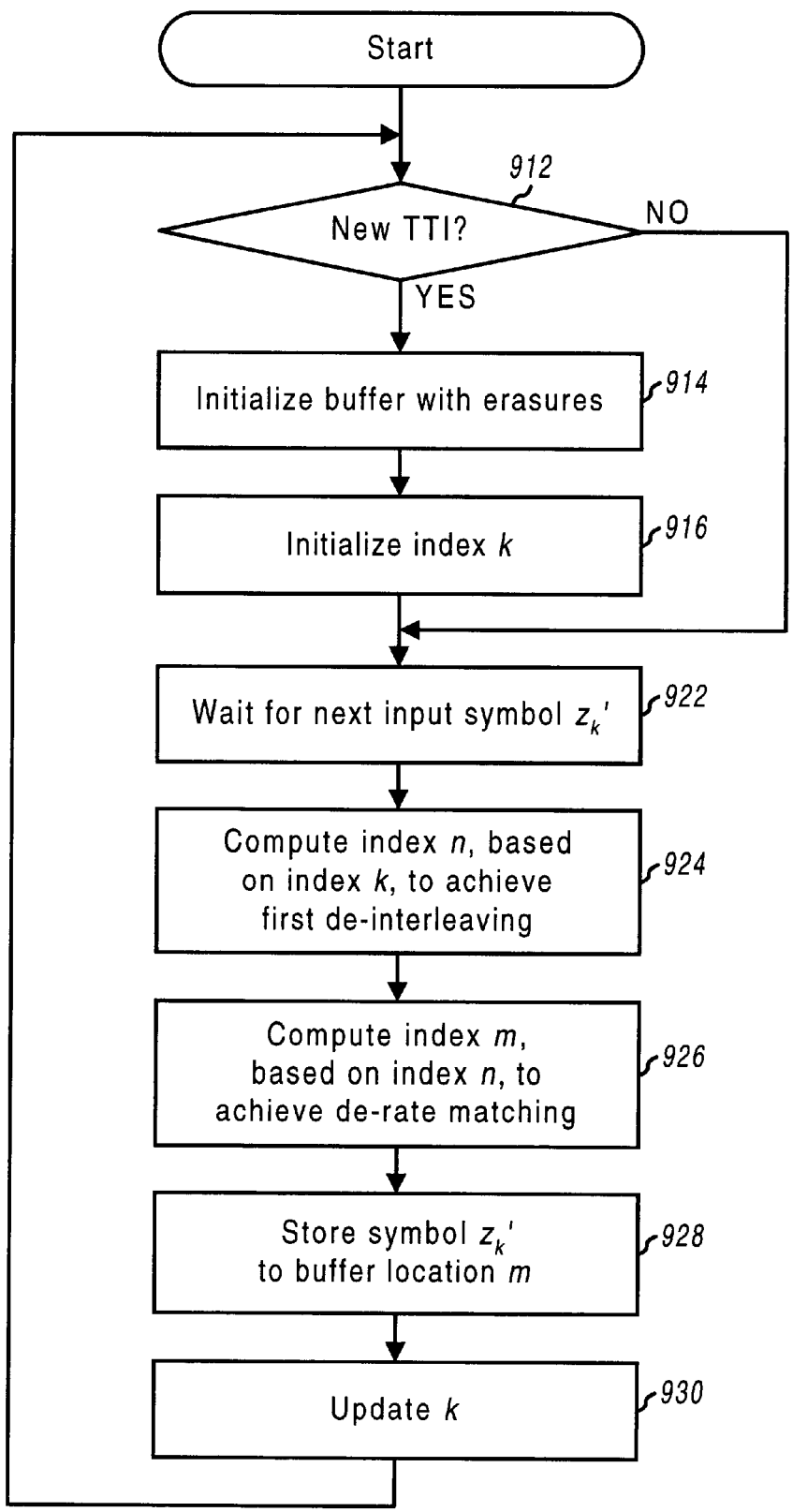
FIG. 9 is a flow diagram of a process to achieve the first de-interleaving and de-rate-matching (erasure insertion) in accordance with an embodiment of the invention.

FIG. 9 is a flow diagram of a process to achieve the first de-interleaving and de-rate-matching (erasure insertion) of the received symbols $z_k'$ in accordance with an embodiment of the invention. Initially, a determination is made whether a new TTI is being received for the transport channel, at step 912. If a new TTI is being received, the buffer is initialized with erasures, at step 914, and the index k is initialized (e.g., to zero), at step 916. If a new TTI is not being received or after the buffer and index k have been initialized, the process waits for receipt of an input symbol $z_k'$, at step 922.

Upon receipt of the symbol $z_k'$, the index n to achieve the first de-interleaving is computed based on the index k of the input symbol, at step 924. The index m to achieve the de-rate-matching (erasure insertion) is then computed based on the computed de-interleaved index n, at step 926. The computation for the index m can be achieved directly from the index n based on equation (7) or can be computed using the erasure insertion algorithm described above. The symbol $z_k'$ is then stored to location m in the buffer, at step 928. Since the buffer has been initialized with erasures prior to the start of the TTI, at step 914, locations in the buffer not stored with symbols $z_k'$ automatically include erasures. The index k is then incremented, at step 930. The process then returns to step 912 and other symbols $z_k'$ in the TTI are processed in similar manner.

Figure 10:
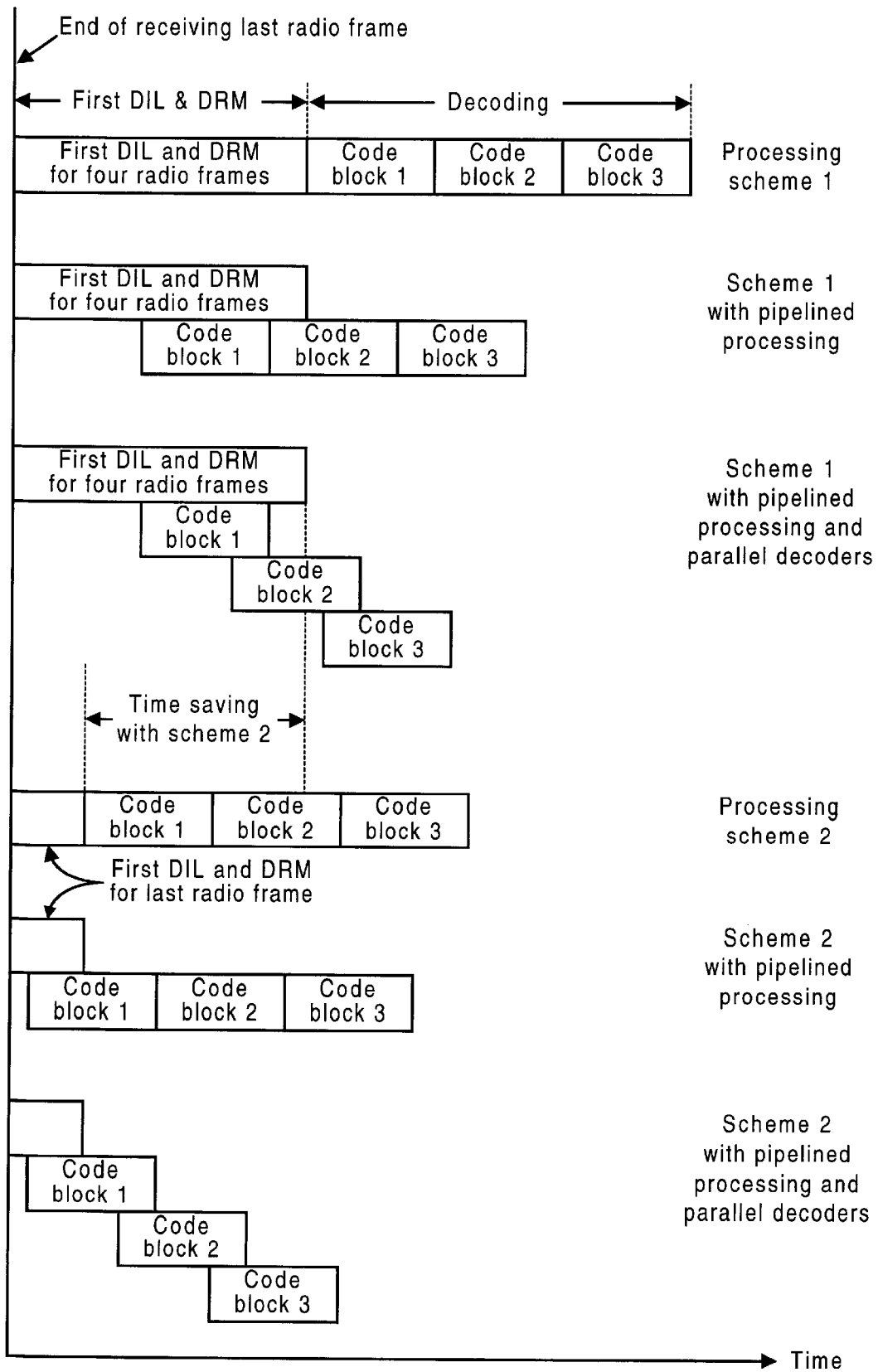
FIG. 10 is a diagram that illustrates the reduction in processing delays that may be achieved with the invention.

FIG. 10 is a diagram that illustrates the reduction in processing delays that may be achieved with various aspects of the invention. In the specific examples shown in FIG. 10, the TTI is four and the traffic includes three code blocks. Various processing schemes can be used to process the received symbol $z_k'$.

In the first processing scheme, the de-interleaving, de-rate-matching (symbol accumulation or erasure insertion), and decoding are performed sequentially. Also, for this processing scheme, the de-interleaving and de-rate-matching are performed for each TTI of symbols (i.e., each traffic). The first processing scheme can correspond to the first and second schemes in FIG. 5 and the first scheme in FIG. 8. In the first processing scheme, the received symbols $z_k'$ are stored and, after the entire TTI of symbols have been received, the traffic is de-interleaved and de-rate-matched to obtain de-rate-matched symbols $x_m'$. After the entire traffic has been de-rate-matched, the symbols $x_m'$ are then decoded, one code block at a time. The sequential processing in this scheme results in longer processing delays.

In the first processing scheme with pipelined processing, the de-interleaving, de-rate-matching, and decoding are staggered. In this processing scheme, the received symbols $z_k'$ are stored and, after the entire TTI of symbols have been received, the traffic is de-interleaved and de-rate-matched to obtain de-rate-matched symbols $x_m'$. After the first code block have been de-rate-matched, the symbols $x_m'$ for the code block can be decoded. While the de-interleaving and de-rate-matching are performed for the next code block, the current code block can be decoded. This results in reduced processing delays. As shown in FIG. 10, this processing scheme can provide a time saving of at least ((C−1)/C)·(the time to perform the de-rate-matching), where C is the number of code blocks in the TTI.

In the first processing scheme with pipelined processing and parallel decoders, the de-interleaving, de-rate-matching, and decoding are also staggered, and the decoding for multiple code blocks is performed in parallel using a number of decoders. In this processing scheme, after a particular code block have been de-rate-matched, the symbols $x_m'$ for the code block can be decoded with an assigned decoder. The parallel decoding further reduces the processing delays, as shown in FIG. 10. In the second processing scheme, the de-interleaving and de-rate-matching are performed on a per radio frame basis (instead of a per TTI basis) on received symbols $z_k'$, which are stored as de-interleaved and de-rate-matched symbols in the buffer. This second processing scheme can correspond to the third scheme in FIG. 5 and the second scheme in FIG. 8. In the second processing scheme, after the entire TTI of symbols have been received, only the last radio frame in the traffic needs to be de-interleaved and de-rate-matched. Once this is accomplished, the entire traffic is ready for decoding. The symbols $x_m'$ for the first code block can be retrieved and decoded. This scheme has reduced processing delays associated with the de-interleaving and de-rate-matching.

In the second processing scheme with pipelined processing, the de-interleaving, de-rate-matching, and decoding are staggered, and the decoding is performed on the first code block when it is ready, instead of having to wait for the entire traffic to be ready. This scheme has reduced processing delays relative to the second processing scheme without pipelining.

In the second processing scheme with pipelined processing and parallel decoders, the de-interleaving, de-rate-matching, and decoding are also staggered, and the decoding of multiple code blocks is performed in parallel. This processing scheme has the shortest processing delays.

Referring back to FIG. 5, when bit repetition is used at the transmitter unit, the de-interleaving and de-rate-matching can be performed on the received symbols $z_k'$ as they are stored to the buffer (the third scheme in FIG. 5). This allows the decoding to be initiated as soon as the traffic is received (the third processing scheme in FIG. 10).

Referring back to FIG. 8, when puncturing is used at the transmitter unit, the de-interleaving and de-rate-matching can be performed on the received symbols $z_k'$ as they are stored to the buffer (the second scheme in FIG. 8). This allows the decoding to be initiated as soon as the traffic is received (again, the third processing scheme in FIG. 10). Alternatively, to reduce the memory requirement by not storing erasures, the erasure insertion can be performed as the de-interleaved symbols are retrieved from the buffer (the first scheme in FIG. 8). The decoding can then be performed on the de-rate-matched symbols $x_m'$ as they are generated.

Figure 11:
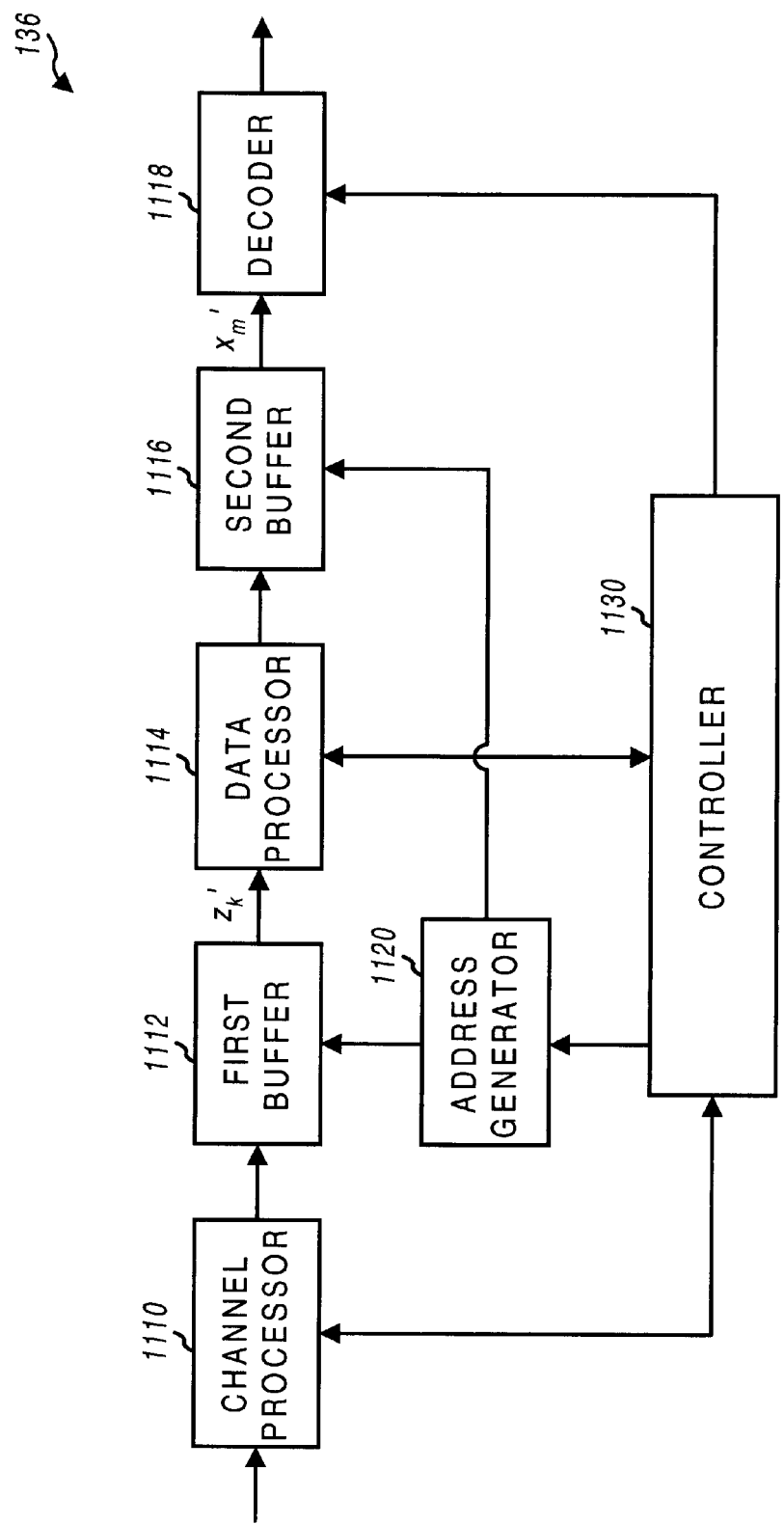
FIG. 11 is a simplified block diagram of an embodiment of a receive data processor.

FIG. 11 is a simplified block diagram of an embodiment of receive data processor 136, which is suitable for processing a downlink data transmission in accordance with the W-CDMA standard. Receive data processor 136 can be used to perform some of the signal processing described above in FIG. 2B. The received signal is conditioned and digitized within receiver 134 to provide digitized samples. A channel processor 1110 then receives and processes the samples to generate symbols for one or more physical channels. The processing typically includes despreading, decovering, and pilot demodulation, as described in U.S. Patent Application Serial No. 09/655,609, entitled "METHOD AND APPARATUS FOR PROCESSING A PHYSICAL CHANNEL WITH PARTIAL TRANSPORT FORMAT INFORMATION," filed Sept. 6, 2000, U.S. Pat. No. 5,764,687, entitled "MOBILE DEMODULATOR ARCHITECTURE FOR A SPREAD SPECTRUM MULTIPLE ACCESS COMMUNICATION SYSTEM," and U.S. Pat. No. 5,490,165, entitled "DEMODULATION ELEMENT ASSIGNMENT IN A SYSTEM CAPABLE OF RECEIVING MULTIPLE SIGNALS." These patents and patent application are assigned to the assignee of the present invention and incorporated herein by reference.

The symbols from channel processor 1110 are stored to a first buffer 1112, which can be implemented in the manner described in the aforementioned U.S. Patent Application Serial No. 09/657,220, entitled "DATA BUFFER STRUCTURE FOR PHYSICAL AND TRANSPORT CHANNELS IN A CDMA SYSTEM", filed Sep. 6, 2000, assign to the assignee of the present invention, and incorporated herein by reference. Buffer 1112 can be operated to achieve (1) the second de-interleaving in block 252 of FIG. 2B (by writing the symbols to, or reading the symbols from, the buffer in a second permutated order) and (2) the physical channel concatenation in block 254 (e.g., by writing symbols for the physical channels in contiguous sections of the buffer). Symbols are then retrieved from buffer 1112 and provided to a data processor 1114.

Data processor 1114 can be operated to achieve the first de-interleaving and the de-rate matching complementary to the rate matching performed in block 218. The first de-interleaving can be achieved by computing the index n to which the symbol $z_k'$ should be stored. And the de-rate-matching can be achieved by computing the index m, based on the computed index n, in accordance with one of the techniques described above. Thus, the first de-interleaving and de-rate-matching can both be achieved by writing the symbols $z_k'$ to buffer 1116 in a permutated order. When all transport channel radio frames for a particular traffic have been received, a controller 1130 can be signaled, which then schedules the subsequent processing (e.g., decoding) of the traffic.

Decoder 1118 performs decoding in a manner complementary to the coding scheme used at the transmitter unit. Specifically, decoder 1118 performs Viterbi decoding for convolutionally coded data, Turbo decoding for Turbo coded data, or no decoding or non-coded data. A CRC checker within decoder 1118 typically further performs error detection based on the appended CRC bits. Decoder 1118 then provides the decoded data to the data sink.

First and second buffers 1112 and 1116 can each be implemented in the manner described above the aforementioned U.S. Patent Application Serial No. 09/657,220. In particular, each of buffers 1112 and 1116 can be implemented a buffer that can be partitioned into sections. One section can be assigned to each physical or transport channel and operated as a circular buffer. Buffer 1116 can also be implemented with a bank of memory units (e.g., one for each radio frame in the longest TTI plus some additional memory units to account for processing delays).

Buffers 1112 and 1116 can each be implemented with various memory structures. Each (or both) of buffers 1112 and 1116 can be implemented with using one or more memory units, with a multi-port memory unit, with a memory unit that comprises of, or is partitioned into, a number of memory banks, or using other structures. For example, buffers 1112 and 1116 can be implemented with a common memory unit. Buffers 1112 and 1116 can also be implemented with various memory technologies such as, for example, random access memory (RAM), dynamic RAM (DRAM), Flash memory, and others. Various structures and implementations of buffers 1112 and 1116 are possible and within the scope of the present invention.

As shown in FIG. 11, an address generator 1120 is provided to operate buffers 1112 and 1116 and to maintain the write and read pointers for the sections of these buffers. Address generator 1120 can be designed to implement the algorithms and/or the equations described above to compute the desired index m (for the receiver unit) or the index k for the transmitter unit. Address generator 1120 can be implemented as a separate unit, integrated within controller 1130 or the buffers, or implemented within an ASIC that also includes the other processing elements.

The processing units described herein (e.g., the physical channel processor, data processor, decoder, controller, and others) can be implemented in various manners. For example, each of these processing units can be implemented in an application specific integrated circuit (ASIC), a digital signal processor, a microcontroller, a microprocessor, or other electronic circuits designed to perform the functions described herein. The processing units can also be integrated into one or more integrated circuits. Also, the processing units can be implemented with a general-purpose or specially designed processor operated to execute instruction codes that achieve the functions described herein. Thus, the processing units described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for processing symbols received for a channel in a communication system, the method comprising:

receiving a symbol associated with a first index k;

determining a second index n based on the first index k;

determining a third index m based on the second index n, wherein the third index m is selected to reverse a particular processing previously performed on the received symbol; and providing the received symbol to a buffer at a location related to the third index m.

2. The method of claim 1, wherein the second index n is selected to achieve a de-interleaving complementary to a first interleaving defined by W-CDMA standard.

3. The method of claim 1, wherein the third index m is selected to reverse a rate-matching defined by the W-CDMA standard.

4. The method of claim 1, wherein the received symbol is accumulated with a value previously stored to the location related to the third index m.

5. The method of claim 1, wherein the received symbol is stored to the location related to the third index m.

6. The method of claim 1, wherein the third index m is determined via a direct computation.

7. The method of claim 6, wherein at least one erasure is to be inserted among the symbols, and wherein the direct computation is expressed as:

$$m = \left\lceil \frac{n \cdot e_{plus} - e_{ini}}{e_{plus} - e_{minus}} \right\rceil,$$

where $e_{ini}$, $e_{plus}$, and $e_{minus}$ are rate-matching parameters defined by W-CDMA standard.

8. The method of claim 6, wherein at least one of the symbols is a repeated transmission, and wherein the direct computation is expressed as:

$$m = \left\lceil \frac{e_{plus} \cdot (n-1) + e_{ini}}{e_{plus} + e_{minus}} \right\rceil,$$

where $e_{ini}$, $e_{plus}$, and $e_{minus}$ are rate-matching parameters defined by W-CDMA standard.

9. The method of claim 1, wherein the third index m is determined via iterative computations.

10. The method of claim 1, wherein the symbols being processed are associated with a particular transmission time interval (TTI) of a transport channel defined by W-CDMA standard.

11. The method of claim 10, further comprising:
repeating the receiving, determining of the second and third indices, and storing for each symbol in the particular TTI.

12. The method of claim 10, further comprising:
initializing the buffer prior to storage of symbols for the particular TTI.

13. The method of claim 12, wherein the buffer is initialized with erasures if one or more bits are punctured at a transmission source and initialized with zeros if one or more bits are repeated at the transmission source.

14. The method of claim 10, further comprising:
initializing the index k prior to reception of symbols for the particular TTI.

15. A method for processing symbols received for a channel in a communication system, the method comprising:
receiving a symbol associated with a first index k;
determining a second index m based in part on the first index k, wherein the second index m is selected to reverse an interleaving and a rate-matching previously performed on the received symbol; and
providing the received symbol to a buffer at a location related to the second index m.

16. The method of claim 15, wherein the interleaving and rate-matching are defined by W-CDMA standard.

17. The method of claim 15, further comprising:
inserting one or more erasures at one or more locations in the buffer for bits punctured at a transmission source.

18. The method of claim 15, further comprising:
if the received symbol corresponds to a repeated bit in a data transmission, accumulating the received symbol with a value previously stored at the location related to the second index m.

19. The method of claim 15, where the second index m is determined from the first index k based on a set of direct computations.

20. A method for processing symbols received for a transport channel in a W-CDMA system, the method comprising:
receiving a symbol for a particular transmission time interval (TTI) and associated with a first index k;
determining a second index m based in part on the first index k, wherein the second index m is selected to reverse an interleaving and a rate-matching previously performed on the received symbol as defined by W-CDMA standard; and
providing the received symbol to a buffer at a location related to the second index m.

21. A method for performing reverse rate-matching on received symbols in a communication system, the method comprising:
receiving a symbol $y_n$ associated with a first index n;
determining a second index m to achieve the reverse rate-matching for the received symbol $y_n$, wherein the second index m is computed in accordance with a direct computation with the index n as an input variable; and
associating the received symbol $y_n$ with the second index m.

22. The method of claim 21, wherein the associating includes providing the received symbol $y_n$ to a buffer at a location related to the second index m.

23. The method of claim 21, wherein at least one erasure is to be inserted among the received symbols, and wherein the direct computation is expressed as:

$$m = \left\lceil \frac{n \cdot e_{plus} - e_{ini}}{e_{plus} - e_{minus}} \right\rceil,$$

where $e_{ini}$, $e_{plus}$, and $e_{minus}$ are rate-matching parameters defined by W-CDMA standard.

24. The method of claim 21, wherein at least one of the received symbols is a repeated transmission, and wherein the direct computation is expressed as:

$$m = \left\lceil \frac{e_{plus} \cdot (n-1) + e_{ini}}{e_{plus} + e_{minus}} \right\rceil,$$

where $e_{ini}$, $e_{plus}$, and $e_{minus}$ are rate-matching parameters defined by W-CDMA standard.

25. A receiver unit operative to process symbols received via at least one channel in a communication system, the receiver unit comprising:
a channel processor operative to process samples received for the at least one channel to provide symbols associated with a first index k; and
a buffer operatively coupled to the channel processor and configured to store the symbols from the channel processor, wherein the symbols are stored to locations related to a second index m, and wherein the second index m is selected to reverse two processing operations performed at a transmission source.

26. The receiver unit of claim 25, wherein the second index m is computed to achieve a de-interleaving and a de-rate-matching of the symbols complementary to an interleaving and a rate-matching defined by W-CDMA standard.

27. The receiver unit of claim 25, wherein the symbols from the channel processor are stored to permutated locations in the buffer to reverse an interleaving and a rate-matching performed on the received symbol.

28. The receiver unit of claim 27, further comprising:
an address generator coupled to the buffer and operative to provide addresses for writing symbols to the permutated locations.

29. The receiver unit of claim 27, further comprising:
a controller coupled to the channel processor and the buffer and operative to direct-writing of symbols to the permutated locations.

30. The receiver unit of claim 25, further comprising:
a decoder coupled to the buffer and operative to receive and decode symbols from the buffer.

31. A receiver unit comprising the channel processor and buffer of claim 25, and further operative to process a downlink data transmission in accordance with W-CDMA standard.

32. A receiver unit comprising the channel processor and buffer of claim 25, and further operative to process an uplink data transmission in accordance with W-CDMA standard.

* * * * *